(12) United States Patent
Yun et al.

(10) Patent No.: US 11,658,403 B2
(45) Date of Patent: May 23, 2023

(54) DEVICE, PACKAGE AND/OR SUBSTRATE COMPRISING CURVED ANTENNA

(71) Applicant: QUALCOMM Incorporated, San Diego, CA (US)

(72) Inventors: Changhan Hobie Yun, San Diego, CA (US); Daniel Daeik Kim, San Diego, CA (US); Paragkumar Ajaybhai Thadesar, San Diego, CA (US); Nosun Park, Incheon (KR); Sameer Sunil Vadhavkar, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 48 days.

(21) Appl. No.: 17/002,594

(22) Filed: Aug. 25, 2020

(65) Prior Publication Data

US 2022/0069453 A1    Mar. 3, 2022

(51) Int. Cl.
| | | |
|---|---|---|
| H01Q 9/04 | (2006.01) | |
| H01Q 1/38 | (2006.01) | |
| H01Q 13/02 | (2006.01) | |
| H01Q 21/28 | (2006.01) | |
| H04B 3/52 | (2006.01) | |
| H04B 3/56 | (2006.01) | |

(52) U.S. Cl.
CPC ............ H01Q 1/38 (2013.01); H01Q 13/02 (2013.01); H01Q 21/28 (2013.01); H04B 3/52 (2013.01); H04B 3/56 (2013.01)

(58) Field of Classification Search
CPC .......... H01Q 1/38; H01Q 13/02; H01Q 21/28; H01Q 21/06; H01Q 1/2283; H01Q 9/0471; H04B 3/52; H04B 3/56
See application file for complete search history.

(56) References Cited

U.S. PATENT DOCUMENTS

| | | | | |
|---|---|---|---|---|
| 6,417,817 B1* | 7/2002 | Pirila | ........................ | H01Q 1/38 343/702 |
| 2008/0291107 A1* | 11/2008 | Tsai | ........................ | H01Q 1/2283 438/106 |
| 2018/0190612 A1* | 7/2018 | Ndip | ........................ | H01L 23/13 |
| 2020/0144721 A1* | 5/2020 | Ndip | ........................ | H01Q 7/00 |

FOREIGN PATENT DOCUMENTS

| | | |
|---|---|---|
| EP | 3346546 A1 | 7/2018 |
| WO | 2008082088 A1 | 7/2008 |

OTHER PUBLICATIONS

International Search Report and Written Opinion—PCT/US2021/046931—ISA/EPO—dated Nov. 23, 2021.

* cited by examiner

*Primary Examiner* — David E Lotter
(74) *Attorney, Agent, or Firm* — Michelle Gallardo

(57) ABSTRACT

A substrate that includes at least one dielectric layer, a plurality of interconnects, and a curved antenna coupled to a surface of the substrate. The curved antenna is curved relative to the surface of the substrate such that at least part of the curved antenna is offset from the surface of the substrate. The substrate includes a first antenna dielectric layer coupled to the surface of the substrate, an antenna ground interconnect coupled to the first antenna dielectric layer, and a second antenna dielectric layer coupled to the antenna ground interconnect. The antenna ground interconnect configured to be coupled to ground. The curved antenna is coupled to the second antenna dielectric layer.

37 Claims, 24 Drawing Sheets

PROFILE VIEW

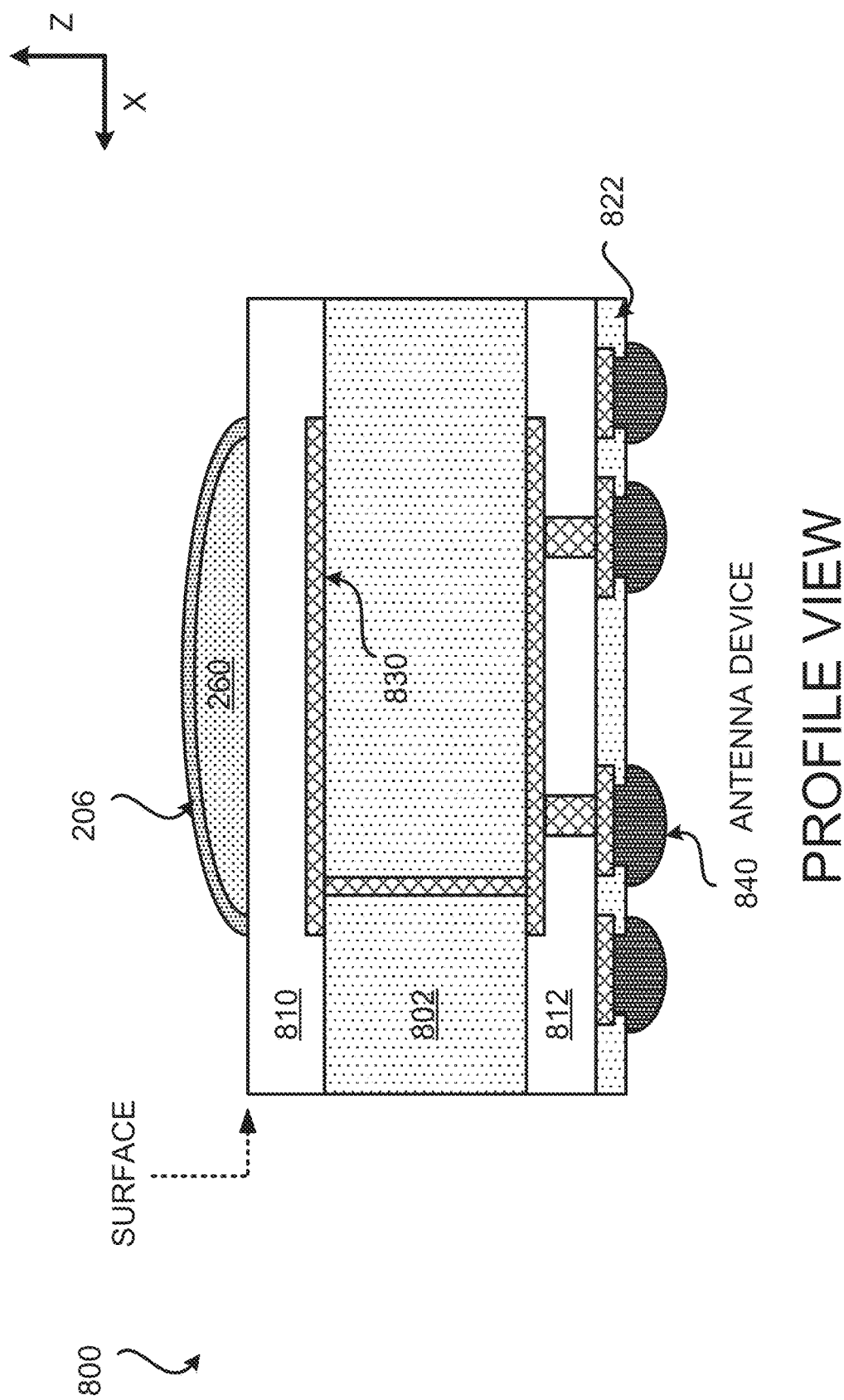

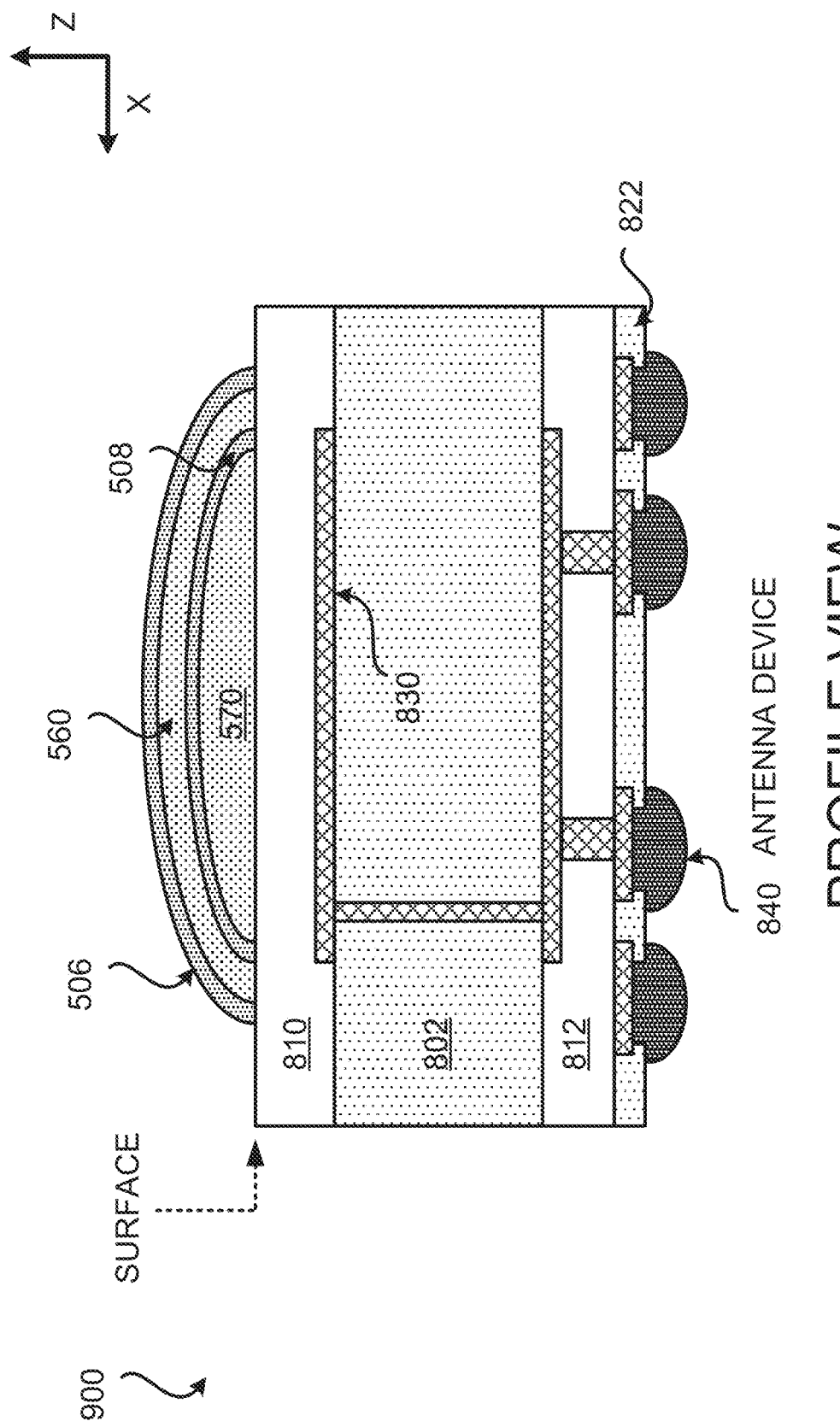

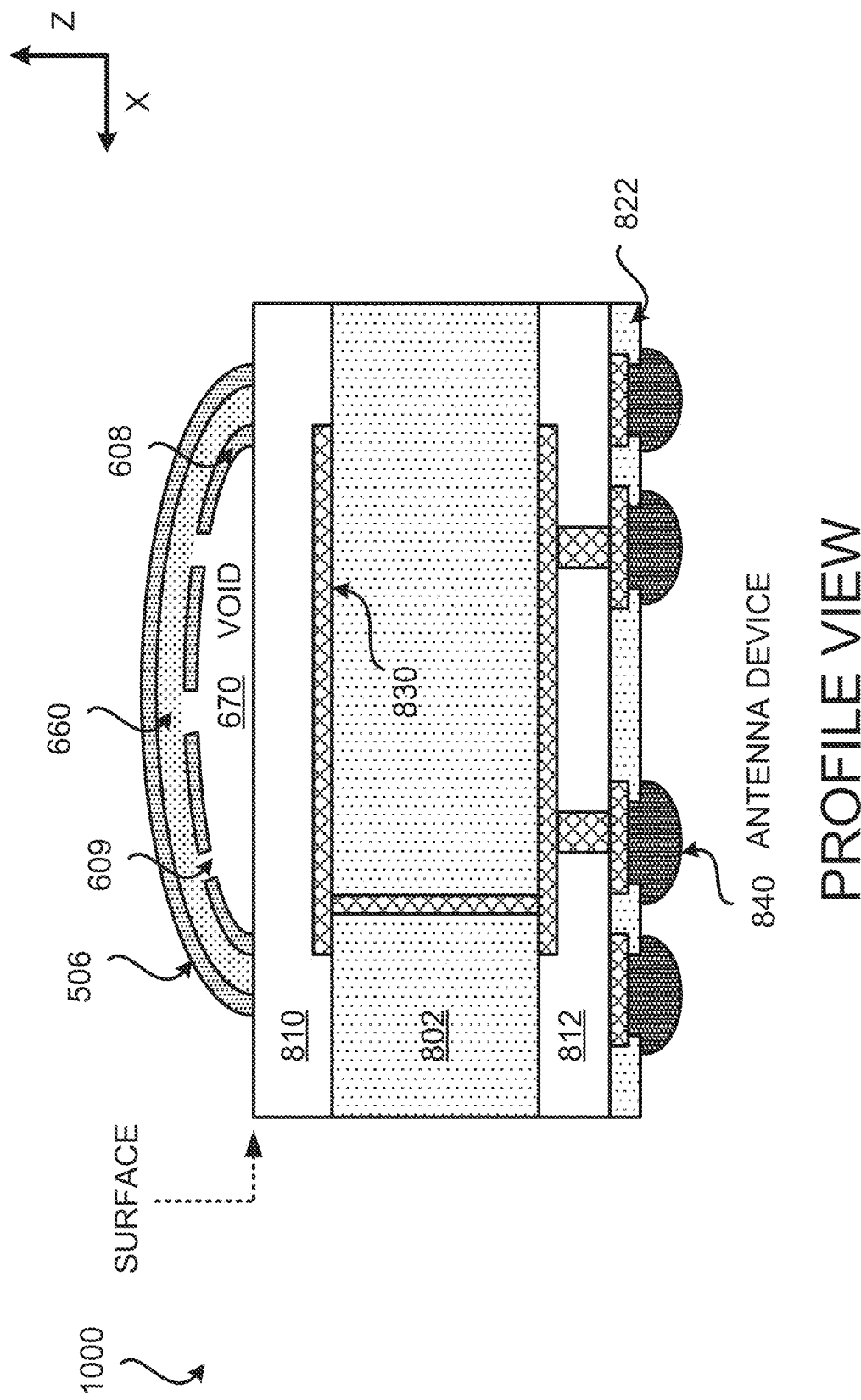

PROFILE VIEW

PROFILE VIEW

PLAN VIEW

PLAN VIEW

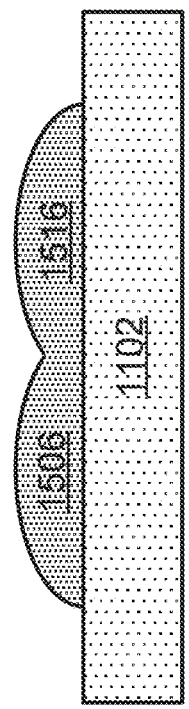
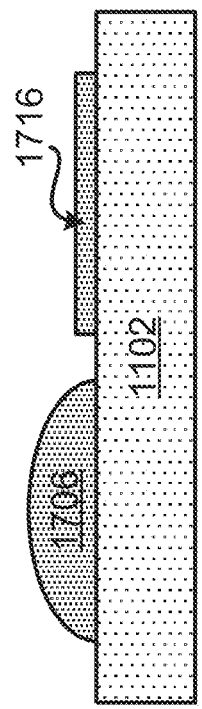
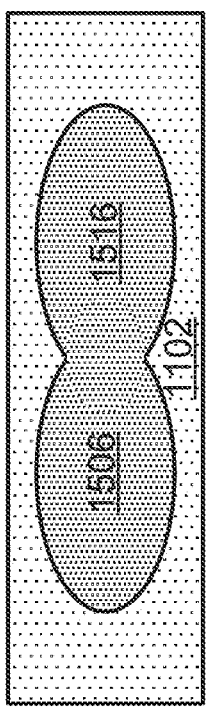
PLAN VIEW
FIG. 15
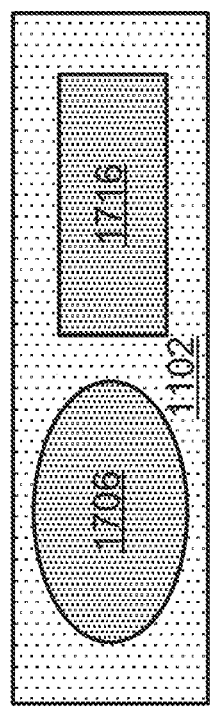
PLAN VIEW
FIG. 17

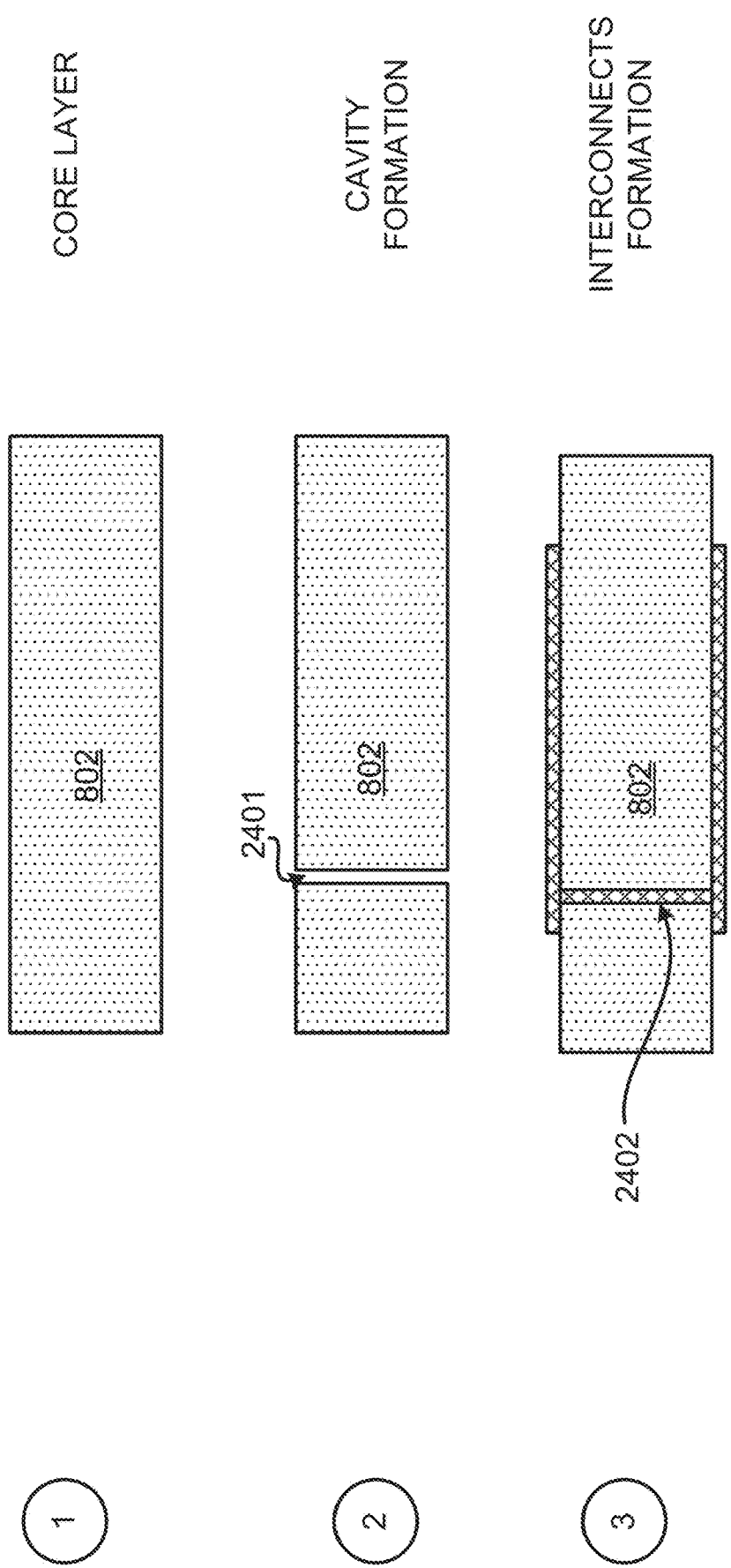

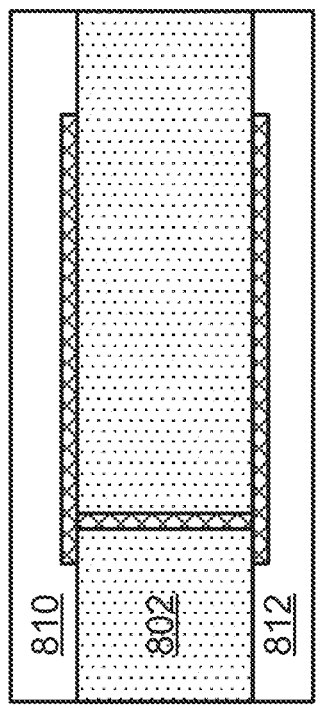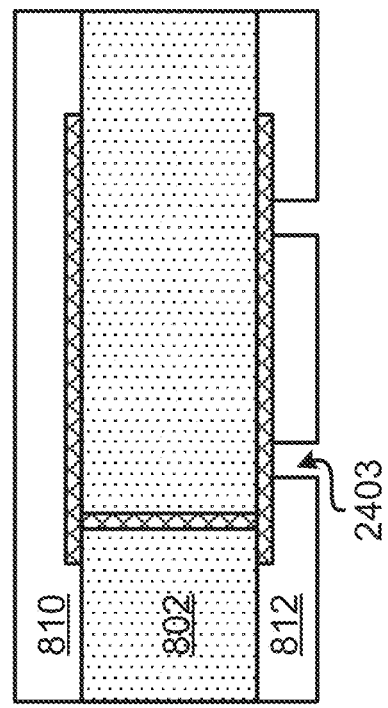
FIG. 24B

DEVICE, PACKAGE AND/OR SUBSTRATE COMPRISING CURVED ANTENNA

FIELD

Various features relate to devices, packages and/or substrates with an antenna.

BACKGROUND

FIG. 1 illustrates a package 100 that includes a substrate 102, a die 103 and a die 105. The die 103 and the die 105 are coupled to the substrate 102. The substrate 102 includes at least one dielectric layer 120 and a plurality of interconnects 122. The substrate 102 also includes a first antenna 150 and a second antenna 160. Both the first antenna 150 and the second antenna 160 are embedded in the substrate 102. Both the first antenna 150 and the second antenna 160 are flat antennas. The first antenna 150 and the second antenna 160 may each be defined by an interconnect in the substrate 102.

There is an ongoing need to provide devices, packages and/or substrates with antennas that have improved transmitting and receiving performances.

SUMMARY

Various features relate to devices, packages and/or substrates with an antenna.

One example provides a substrate that includes at least one dielectric layer, a plurality of interconnects, and a curved antenna coupled to a surface of the substrate. The curved antenna is curved relative to the surface of the substrate such that at least part of the curved antenna is offset from the surface of the substrate.

Another example provides an antenna device that includes at least one dielectric layer, a plurality of interconnects and a curved antenna coupled to a surface of the antenna device. The curved antenna is curved relative to the surface of the antenna device such that at least part of the curved antenna is offset from the surface of the antenna device.

Another example provides a package that includes a substrate and a first antenna device coupled to the substrate. The first antenna device includes at least one dielectric layer, a plurality of interconnects, and a curved antenna coupled to a surface of the first antenna device. The curved antenna is curved relative to the surface of the first antenna device such that at least part of the curved antenna is offset from the surface of the first antenna device.

Another example provides a method that forms at least one dielectric layer. The forms a plurality of interconnects in and over the at least one dielectric layer. The method forms a curved antenna over a surface of the at least one dielectric layer. The curved antenna is curved relative to the surface of the at least one dielectric layer. The at least part of the curved antenna is offset from the surface of the at least one dielectric layer.

BRIEF DESCRIPTION OF THE DRAWINGS

Various features, nature and advantages may become apparent from the detailed description set forth below when taken in conjunction with the drawings in which like reference characters identify correspondingly throughout.

FIG. 8 illustrates a profile view of an exemplary antenna device that includes a curved antenna.

FIG. 9 illustrates a profile view of an exemplary antenna device that includes a curved antenna.

FIG. 10 illustrates a profile view of an exemplary antenna device that includes a curved antenna.

FIG. 15 illustrates a plan view of several exemplary curved antennas.

FIG. 16 illustrates a profile view of several exemplary curved antennas.

FIG. 17 illustrates a plan view of several exemplary curved antennas.

FIG. 18 illustrates a profile view of several exemplary curved antennas.

FIGS. 24A-24D illustrate an exemplary sequence for fabricating a discrete antenna device that includes a curved antenna

DETAILED DESCRIPTION

In the following description, specific details are given to provide a thorough understanding of the various aspects of the disclosure. However, it will be understood by one of ordinary skill in the art that the aspects may be practiced without these specific details. For example, circuits may be shown in block diagrams in order to avoid obscuring the aspects in unnecessary detail. In other instances, well-known circuits, structures and techniques may not be shown in detail in order not to obscure the aspects of the disclosure.

The present disclosure describes a substrate that includes at least one dielectric layer, a plurality of interconnects and a curved antenna coupled to a surface of the substrate. The curved antenna is curved relative to the surface of the substrate such that at least part of the curved antenna is offset (e.g., vertically offset) from the surface (e.g., planar surface) of the substrate. The curved antenna is coupled to a surface of the at least one dielectric layer. The curved antenna may be coupled to the plurality of interconnects. The curved antenna may include a concave antenna. The concave antenna may be concave relative to the surface of the substrate. The curved antenna may include a non-linear surface. The curved antenna may be implemented in a substrate that is part of an antenna device. The curved antenna may be implemented in a substrate that is part of a package, such as an antenna in package (AiP). The package may include a radio frequency front end (RFFE) package. The substrate may include more than one antenna. For example, the substrate may include several antennas, where at least one antenna is a curved antenna. The curved antenna may include a dome shape. As will be further described below, the curved antenna provides better antenna gains in a particular direction than a flat antenna of comparable size, thus providing an antenna with better directionality and better transmission and/or reception of signals in one or more particular directions. In some implementations, the curved antenna may be near a curved antenna ground interconnect that is configured to be coupled to ground. The curved antenna ground interconnect may help improve the performance of the curved antenna by helping prevent signals from other interconnects and/or antennas from interfering with the signals through the curved antenna.

Exemplary Package Having a Substrate Comprising a Curved Antenna

Figure 1:
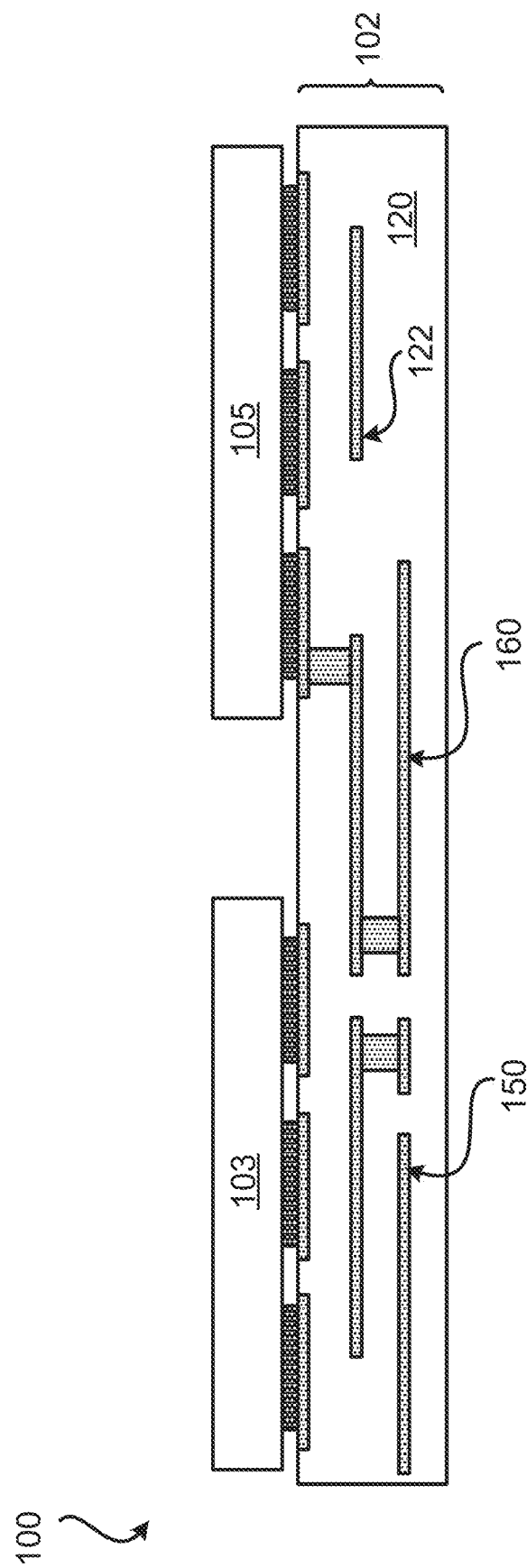
FIG. 1 illustrates a profile view of a package that includes a substrate with antennas embedded in the substrate.
Figure 2:
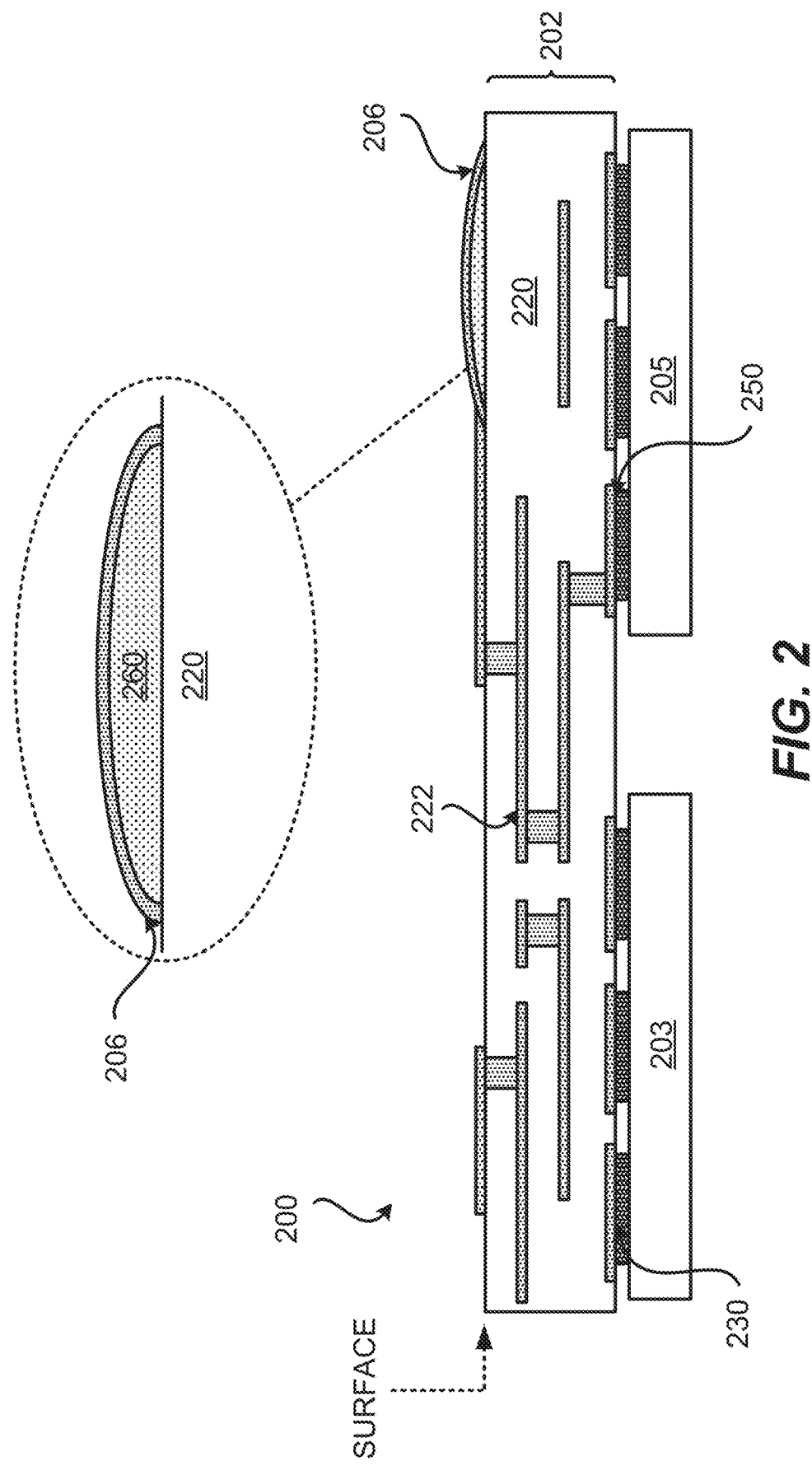
FIG. 2 illustrates a profile view of an exemplary package that includes a substrate with a curved antenna.

FIG. 2 illustrates a profile view of a package 200 that includes a substrate 202, an integrated device 203 and an integrated device 205. The integrated device 203 is coupled to the substrate 202 through a plurality of solder interconnects 230. The integrated device 205 is coupled to the substrate 202 through a plurality of solder interconnects 250. The substrate 202 includes at least one dielectric layer 220, a plurality of interconnects 222, and a curved antenna 206. The curved antenna 206 may be configured to be electrically coupled to the integrated device 203 and/or the integrated device 205. For example, the curved antenna 206 may be configured to be electrically coupled to the integrated device 203 through the plurality of interconnects 222 and the plurality of solder interconnects 230, and the curved antenna 206 may be configured to be electrically coupled to the integrated device 205 through the plurality of interconnects 222 and the plurality of solder interconnects 250.

The curved antenna 206 may be located over a surface (e.g., first surface, top surface) of the substrate 202. For example, the curved antenna 206 may be located over a surface of the at least one dielectric layer 220. The curved antenna 206 may be coupled to the plurality of interconnects 222. The substrate 202 may include an antenna dielectric layer 260. The antenna dielectric layer 260 may be formed and located over a surface of the at least one dielectric layer 220. The antenna dielectric layer 260 may be located between the curved antenna 206 and the surface of the substrate 202. For example, the antenna dielectric layer 260 may be located between the curved antenna 206 and the at least one dielectric layer 220 of the substrate 202. The antenna dielectric layer 260 may include the same material as the at least one dielectric layer 220. The antenna dielectric layer 260 includes a contour shape that is non-linear. For example, the antenna dielectric layer 260 includes a curved contour shape. The curved antenna 206 may be coupled to and/or formed over the curved contour shape of the antenna dielectric layer 260. The shape of the curved antenna 206 may be defined by the shape of the curved contour shape of the antenna dielectric layer 260. The curved antenna 206 is curved relative to the surface of the substrate 202 such that at least part of the curved antenna 206 is offset (e.g., vertically offset) from the surface of the substrate 202 (e.g., surface of the dielectric layer 220 of the substrate 202, planar surface of the substrate 202). The curved antenna 206 includes a non-linear shape and/or non-linear surface. As shown in FIG. 2, the curved antenna 206 includes a concave shape. The concave shape may include a dome shape. However, the shape and/or the curvature of the curved antenna 206 may vary with different implementations. Although one curved antenna is shown, the substrate 202 may include several antennas, where at least one of the antennas is a curved antenna. For example, the substrate 202 may include several combinations of curved antennas and/or flat antennas. In some implementations, all the antennas may be curved antennas (e.g., curved antennas having the same curve or different curves).

The curved antenna 206 may be means for signal transmission and/or reception. That is, the curved antenna 206 may be configured to transmit at least one signal for at least one frequency and/or receive at least one signal for at least one frequency. As will be further described below, a curved antenna provides better directionality and better antenna gains than a flat antenna having a comparable size and/or shape.

The package 200 may be an antenna in package (AiP). The package 200 may be a radio frequency (RF) package. The package 200 (or any of the packages described in the disclosure) may be part of a radio frequency front end (RFFE) package. The package 200 may be configured to provide Wireless Fidelity (WiFi) communication and/or cellular communication (e.g., 2G, 3G, 4G, 5G). The package 200 may be configured to support Global System for Mobile Communications (GSM), Universal Mobile Telecommunications System (UMTS), and/or Long-Term Evolution (LTE). The package 200 may be configured to transmit and receive signals having different frequencies and/or communication protocols.

An integrated device (e.g., 203, 205) may include a die (e.g., bare die). The integrated device may include a radio frequency (RF) device, an analog device, a passive device, a filter, a capacitor, an inductor, an antenna, a transmitter, a receiver, a surface acoustic wave (SAW) filters, a bulk acoustic wave (BAW) filter, a light emitting diode (LED) integrated device, a Silicon (Si) based integrated device, a silicon carbide (SiC) based integrated device, a GaAs based integrated device, a GaN based integrated device, a memory, power management processor, and/or combinations thereof.

Figure 4:
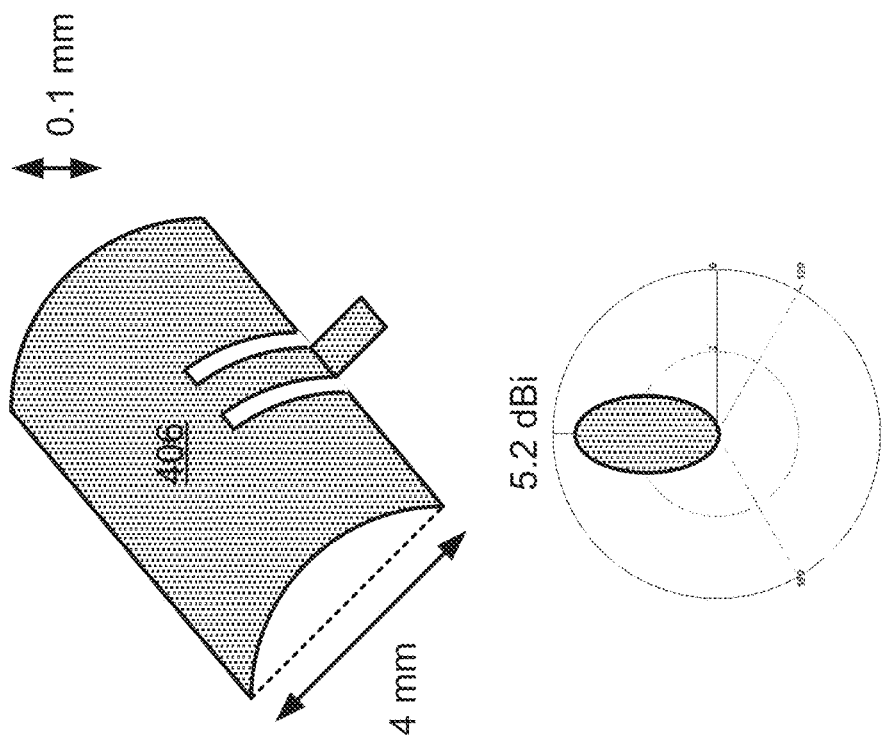
FIG. 4 illustrates a view of an exemplary antenna gain for a curved antenna.
Figure 3:
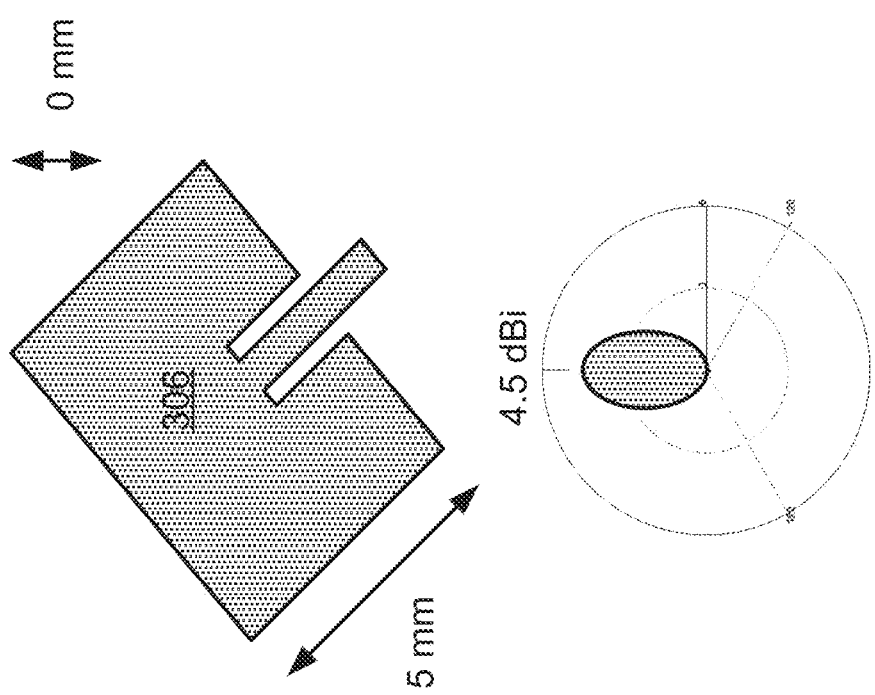
FIG. 3 illustrates a view of an exemplary antenna gain for a flat antenna.

FIGS. 3 and 4 illustrate antenna gains for two comparably size antennas, where one antenna is a flat antenna while the other is a curved antenna. FIG. 3 illustrates a flat antenna 306 having a width of approximately 5 millimeters (mm). The flat antenna 306 is not offset (e.g., not vertically offset) from a surface (e.g., surface of a substrate). The 0 mm shown in FIG. 3 illustrates that the antenna 306 is not offset from the surface. FIG. 3 illustrates that a maximum antenna gain in a particular direction for the flat antenna 306 is approximately 4.5 dBi. An antenna gain may indicate the power transmitted by an antenna in a specific direction as compared to an isotropic antenna. An isotropic antenna is a theoretical antenna that radiates equally in all directions. A higher antenna gain (dBi) means better directionality for the antenna in a particular direction.

FIG. 4 illustrates the curved antenna 406 having a width of approximately 4 millimeters (mm). However, the total surface width of the curved antenna 406 may be approximately 5 mm. At least part of the curved antenna 406 is offset (e.g., vertically offset) from a surface (e.g., surface of a substrate). In this example, some portions of the curved antenna 406 may be offset (e.g., vertically offset) from the surface by as much as 0.1 mm FIG. 4 illustrates that a maximum antenna gain in a particular direction for the curved antenna 406 is approximately 5.2 dBi. Thus, the curved antenna 406 is better at receiving and/or transmitting signals in certain directions than the flat antenna 306 and provides better directionality, even though the curved antenna 406 and the flat antenna 306 have comparable footprint shapes and surface areas. Although the curved antenna 406 may be effectively thicker due to the offset from the surface, the increase in size in the vertical direction is offset by the reduction in size in the lateral direction. In this example, a better antenna gain (and thus better directivity) is achieved and the effective footprint width of the antenna is reduced by 1 mm, while increasing the thickness by only 0.1 mm. The curved antenna 406 may represent any of the curved antenna described in the disclosure. For example, the curved antenna 406 may represent the curved antenna 206. FIGS. 3 and 4 illustrates how curving an antenna helps improve the performance of the antenna and can help decrease the overall footprint of the antenna. It is noted that the values used for the reduction in effective footprint width and increase in thickness is exemplary. Different implementations may have a curved antenna with different effective footprint width reduction and different increase in thicknesses.

Figure 5:
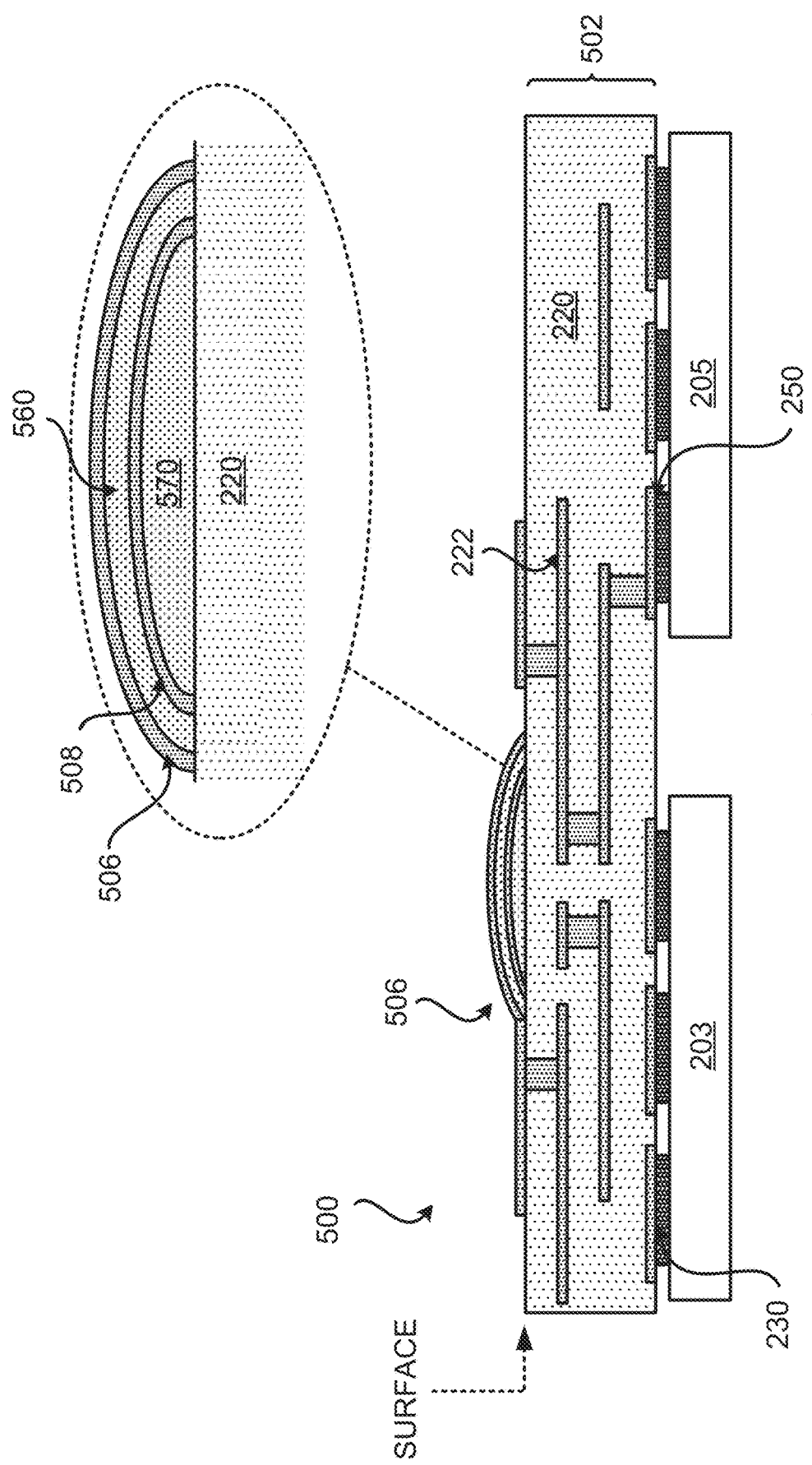
FIG. 5 illustrates a profile view of an exemplary package that includes a substrate with a curved antenna.

Different implementations may have different antenna configurations, designs, shapes and/or sizes. FIG. 5 illustrates another example of a package that includes a substrate with a different antenna configuration. FIG. 5 illustrates a profile view of a package 500 that includes a substrate 502, the integrated device 203 and the integrated device 205. The package 500 is similar to the package 200 of FIG. 2. The substrate 502 is similar to the substrate 202, and thus includes similar or the same components as the substrate 202.

The substrate 502 includes at least one dielectric layer 220, the plurality of interconnects 222, a first antenna dielectric layer 570, an antenna ground interconnect 508, a second antenna dielectric layer 560, and a curved antenna 506. The first antenna dielectric layer 570 is coupled to and/or formed over a surface of the substrate 502. For example, the first antenna dielectric layer 570 is coupled to and/or formed over a surface of the at least one dielectric layer 220 of the substrate 502. The first antenna dielectric layer 570 includes a curved contour shape (e.g., non-linear contour shape). The antenna ground interconnect 508 is coupled to and/or formed over the curved contour shape of the first antenna dielectric layer 570. The antenna ground interconnect 508 has a curved shape that may be defined by the curved contour shape of the first antenna dielectric layer 570. The antenna ground interconnect 508 may be configured to be coupled to ground. The antenna ground interconnect 508 may be coupled to one or more interconnects from the plurality of interconnects 222. The second antenna dielectric layer 560 is coupled to and/or formed over the antenna ground interconnect 508. The second antenna dielectric layer 560 may include a curved contour shape. The curved antenna 506 is coupled to and/or formed over the curved contour of the second antenna dielectric layer 560. The shape of the curved antenna 506 may be defined by the shape of the curved contour of the second antenna dielectric layer 560. The antenna ground interconnect 508 and the curved antenna 506 may be located over the surface of the substrate 502 (e.g., located over the surface of the at least one dielectric layer 220). The antenna ground interconnect 508 and/or the curved antenna 506 may be coupled to respective interconnects from the plurality of interconnects 222. The use of the antenna ground interconnect 508 helps isolate and/or shield the curved antenna 506 from other signals, which in turns helps the curved antenna 506 better transmit and/or receive signals.

Although one curved antenna is shown, the substrate 502 may include several antennas, where at least one of the antennas is a curved antenna. The substrate 502 may include combinations of the antenna designs of FIG. 2 and FIG. 5. Thus, a substrate may include several combinations of various antenna designs from FIG. 2 and FIG. 5.

Figure 6:
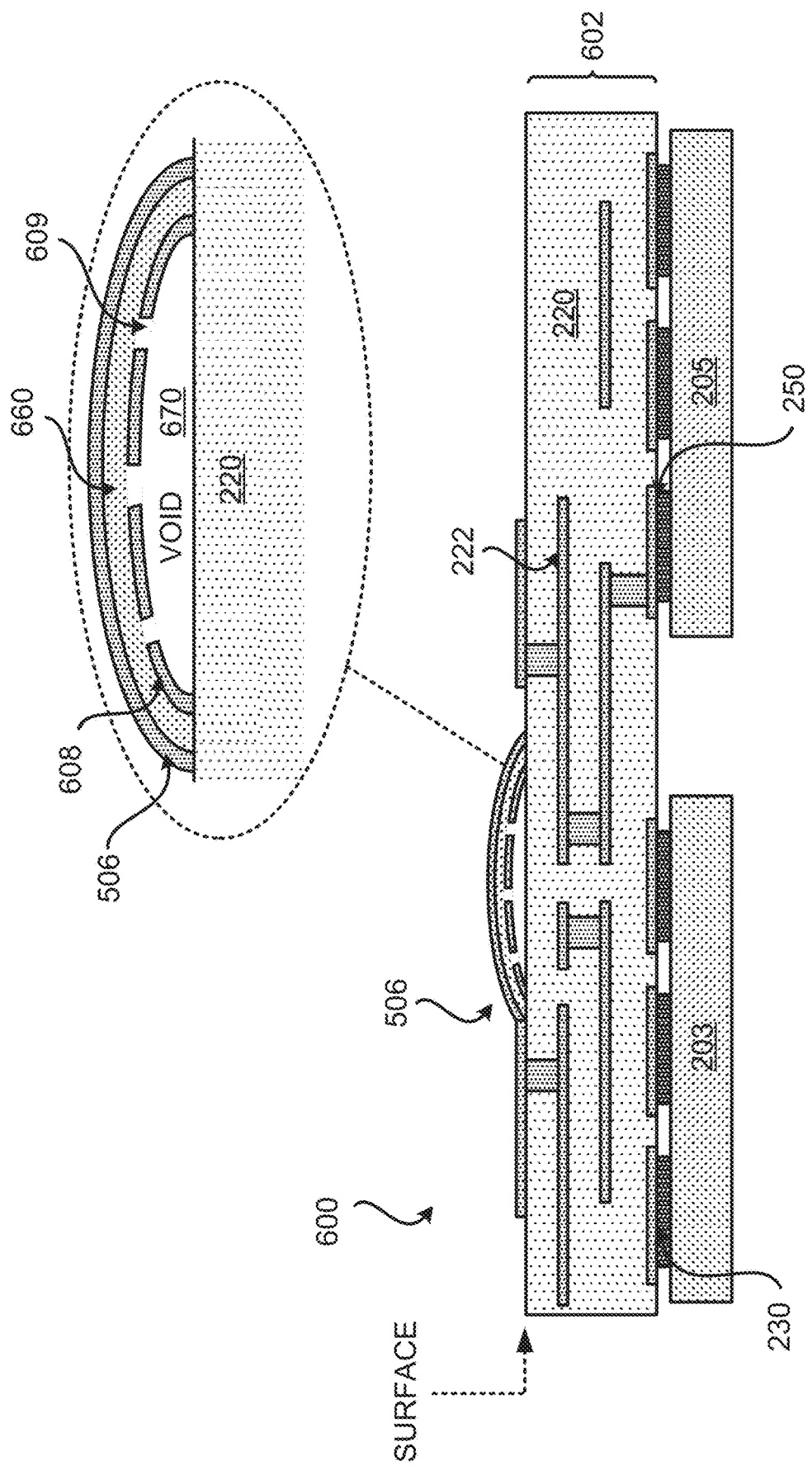
FIG. 6 illustrates a profile view of an exemplary package that includes a substrate with a curved antenna.

FIG. 6 illustrates another example of a package that includes a substrate with a different antenna configuration. FIG. 6 illustrates a profile view of a package 600 that includes a substrate 602, the integrated device 203 and the integrated device 205. The package 600 is similar to the package 500 of FIG. 5. The substrate 602 is similar to the substrate 502, and thus includes similar or the same components as the substrate 502.

The substrate 602 includes at least one dielectric layer 220, the plurality of interconnects 222, a void 670, an antenna ground interconnect 608, an antenna dielectric layer 660, and a curved antenna 506.

The antenna ground interconnect 608 is coupled to and/or formed over the surface of the substrate 602. There is a void 670 located between the antenna ground interconnect 608 and the surface of the substrate 602 (e.g., surface of the at least one dielectric layer 220). A void may be a at least one region that is free of a solid material. A void may include a cavity. A void may be occupied by a gas (e.g., air). The size and/or shape of the void 670 may vary. For example, the void 670 may take up some or all of the space between the dielectric layer 220 and the antenna ground interconnect 608. The antenna ground interconnect 608 has a curved shape and/or curved contour surface. The antenna ground interconnect 608 includes at least one opening 609. The at least one opening 609 may have different shapes, including a circular shape and/or a rectangular shape. The shape of the at least one opening 609 is arbitrary. The antenna ground interconnect 608 may be configured to be coupled to ground. The antenna ground interconnect 608 may be coupled to an interconnect from the plurality of interconnects 222. The antenna dielectric layer 660 is coupled to and/or formed over the antenna ground interconnect 608. The second antenna dielectric layer 660 may include a curved contour shape. The curved antenna 506 is coupled to and/or formed over the curved contour of the antenna dielectric layer 660. The shape of the curved antenna 506 may be defined by the shape of the curved contour of the antenna dielectric layer 660. The antenna ground interconnect 608 and the curved antenna 506 may be located over the surface of the substrate 602 (e.g., located over the surface of the at least one dielectric layer 220). The antenna ground interconnect 608 and/or the curved antenna 506 may be coupled to respective interconnects from the plurality of interconnects 222. The use of the antenna ground interconnect 608 helps isolate and/or shield the curved antenna 506 from other signals, which in turns helps the curved antenna 506 to better transmit and/or receive signals. The void 670 may be occupied by a gas (e.g., air) which provides a very good dielectric properties (e.g., low dielectric constant), which helps minimize signal coupling and dielectric loss (e.g., minimizes power loss). The void 670 may also help seal any micro-electromechanical system (MEMS) device underneath the void 670, such as SAW filters and/or BAW filters, accelerometers, gyroscopes (for wireless sensing) using the curved antenna.

Although one curved antenna is shown, the substrate 602 may include several antennas, where at least one of the antennas is a curved antenna. The substrate 602 may include combinations of the antenna designs of FIGS. 2 and 5-6. Thus, a substrate may include several combinations of various antenna designs from FIGS. 2 and 5-6. In some implementations, when a substrate (e.g., 202, 502, 602) includes several antennas, all of the antennas may be curved antennas (e.g., having different, similar or the same design, dimensions and/or shape).

Figure 7:
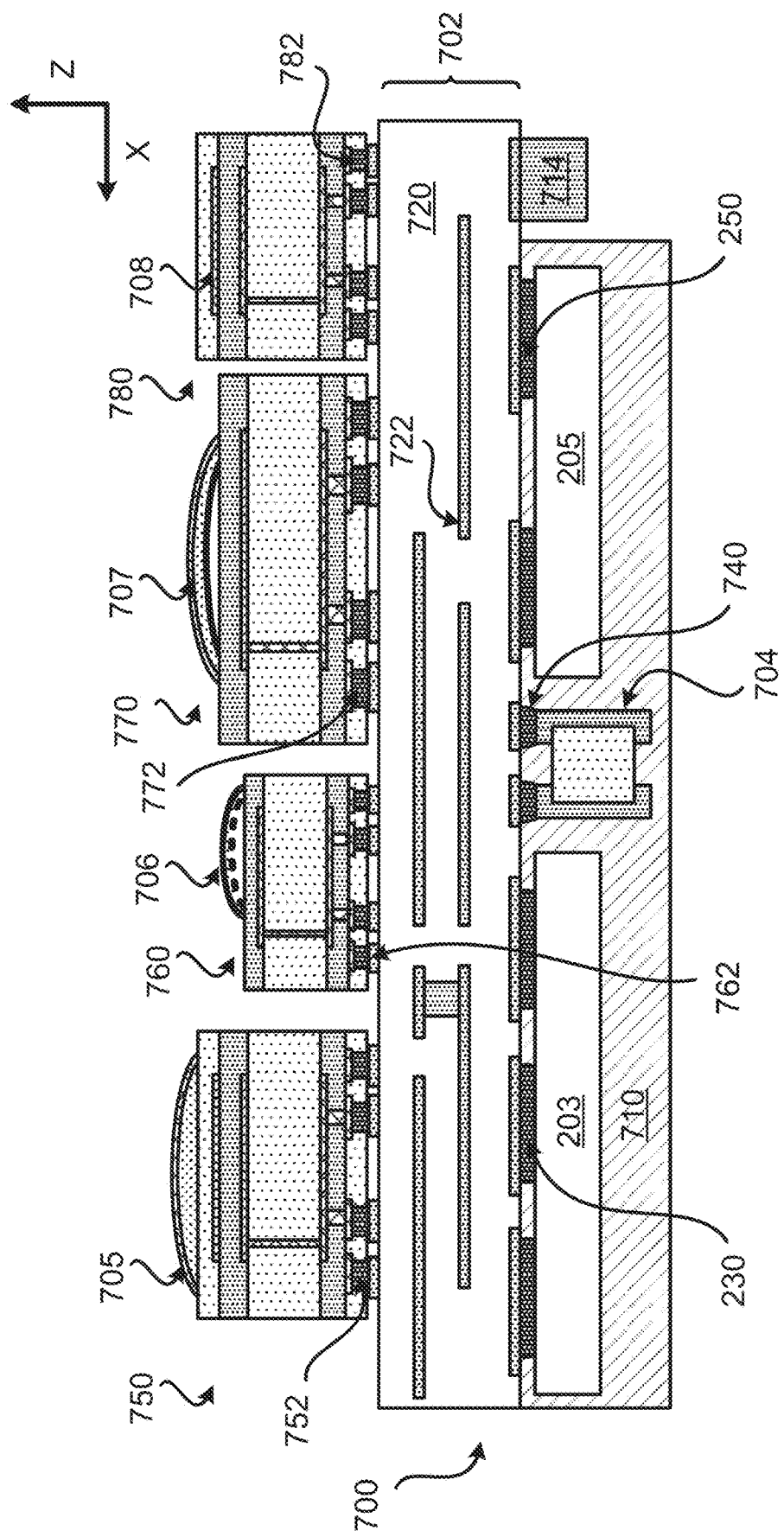
FIG. 7 illustrates a profile view of an exemplary package that includes antenna devices that include a curved antenna.

The curved antenna designs may be implemented in various ways. In some implementations, a curved antenna may be implemented as part of an antenna device. FIG. 7 illustrates a profile view of a package 700 that includes a plurality of discrete antenna devices, where at least some of the discrete antenna devices includes a curved antenna. The package 700 may be antenna in package (AiP). The package 700 may be a radio frequency (RF) package. The package 700 may be part of a radio frequency front end (RFFE) package. The package 700 may be configured to provide Wireless Fidelity (WiFi) communication and/or cellular communication (e.g., 2G, 3G, 4G, 5G). The package 700 may be configured to support Global System for Mobile Communications (GSM), Universal Mobile Telecommunications System (UMTS), and/or Long-Term Evolution (LTE). The package 700 may be configured to transmit and receive signals having different frequencies and/or communication protocols.

The package 700 includes a substrate 702, the integrated device 203, the integrated device 205, a passive device 704, a first antenna device 750, a second antenna device 760, a third antenna device 770, and a fourth antenna device 780. The substrate 702 includes at least one dielectric layer 720 and a plurality of interconnects 722. The substrate 702 includes a first surface (e.g., top surface) and a second surface (e.g., bottom surface). The integrated device 203 is coupled to the second surface of the substrate 702, through a plurality of solder interconnects 230. The integrated device 205 is coupled to the second surface of the substrate 702, through a plurality of solder interconnects 250. The integrated device 203 and the integrated device 205 may include a die (e.g., processor die, memory die). The passive device 704 is coupled to the second surface of the substrate 702, through a plurality of solder interconnects 740. A passive device may include a capacitor or an inductor. For example, the passive device 704 is a capacitor. A connector 714 is coupled to the second surface of the substrate 702.

The package 700 may include an encapsulation layer 710. The encapsulation layer 710 may be formed over the second surface of the substrate 702. The encapsulation layer 710 may encapsulate the integrated device 203, the integrated device 205 and the passive device 704. The encapsulation layer 710 may include a mold, a resin and/or an epoxy. The encapsulation layer 710 may be a means for encapsulation.

The package 700 may include a connector 714. The connector 714 may be configured to allow the package 700 to be electrically coupled to one or more other devices. Different implementations may use different types of connections to electrically couple the package 700 to other devices. For example, the package 700 may be coupled to the other devices through wires and/or flexible interconnects. A power for the package 700 may be provided through the connector 714.

FIG. 7 illustrates that the first antenna device 750, the second antenna device 760, the third antenna device 770 and the fourth antenna device 780 are coupled to the first surface of the substrate 702. The first antenna device 750 is coupled to the first surface of the substrate 702 through a first plurality of solder interconnects 752. The second antenna device 760 is coupled to the first surface of the substrate 702 through a second plurality of solder interconnects 762. The third antenna device 770 is coupled to the first surface of the substrate 702 through a third plurality of solder interconnects 772. The fourth antenna device 780 is coupled to the first surface of the substrate 702 through a fourth plurality of solder interconnects 782. The first antenna device 750, the second antenna device 760, the third antenna device 770, and the fourth antenna device 780 may each be discrete antenna devices. Each of the antenna devices (e.g., 750, 760, 770, 780) may include at least one antenna, such as a curved antenna and/or a flat antenna. For example, the first antenna device 750 includes a curved antenna 705, the second antenna device 760 includes a curved antenna 706, the third antenna device 770 includes a curved antenna 707, and the fourth antenna device 780 includes a flat antenna 708.

The first antenna device 750, the second antenna device 760, the third antenna device 770, the fourth antenna device 780, and/or combinations thereof, may be configured to provide Wireless Fidelity (WiFi) communication and/or cellular communication (e.g., 2G, 3G, 4G, 5G). The first antenna device 750, the second antenna device 760, the third antenna device 770, the fourth antenna device 780, and/or combinations thereof, may be configured to support Global System for Mobile Communications (GSM), Universal Mobile Telecommunications System (UMTS), and/or Long-Term Evolution (LTE). In some implementations, one or more of the antenna devices (e.g., 750, 760, 770, 780), may be configured as a proximity sensor. When a particular antenna device is configured to operate as a proximity sensor, the particular antenna device may be capable of detecting the placement and/or movement of one or more objects (e.g., hand, finger(s)) near the particular antenna device.

The first antenna device 750, the second antenna device 760, the third antenna device 770, the fourth antenna device 780, and/or combinations thereof, may be configured to transmit and receive signals having different frequencies and/or communication protocols. The first antenna device 750 may be means for first signal transmission and/or reception. The second antenna device 760 may be means for second signal transmission and/or reception. The third antenna device 770 may be means for third signal transmission and/or reception. The fourth antenna device 780 may be means for fourth signal transmission and/or reception. The first signal, the second signal, the third signal, and/or the fourth signal may have the same or different properties. For example, the signals may have the same or different frequencies and/or communication protocols. A signal may be an analog signal or a digital signal.

One advantage of using discrete antenna devices is the ability to design and configure the package to meet specific operational requirements of cellular network operators, without having to redesign the entire substrate. Thus, various discrete antenna devices may be mixed and matched together to work with different cellular network operations. The antenna devices (e.g., 750, 760, 770, 780) may be discrete from the substrate 702 because the antenna devices are fabricated during a process that is separate than the fabrication of the substrate 702. Another advantage of the discrete antenna devices is that they are not limited by the size, dimensions, and fabrication limitations of the substrate 702. For example, as will be further described below, an antenna device may partially overhang over the substrate 702.

Different implementations may use the same or different types of antenna devices. The antenna devices may have the same sizes, shapes, and/or configurations, or they may have different sizes, shapes, and/or configurations.

Exemplary Discrete Antenna Devices Comprising a Curved Antenna

FIG. 8 illustrates an antenna device 800. The antenna device 800 may represent any of the antenna devices (e.g., 750, 760, 770, 780) described in the disclosure. The antenna device 800 may be coupled to a substrate of a package. The antenna device 800 may be a discrete antenna device that is fabricated during a fabrication process that is separate than a process used to fabricate a substrate (e.g., package substrate).

The antenna device 800 includes a first dielectric layer 802, a second dielectric layer 810, a third dielectric layer 812, a solder resist layer 822, a plurality of interconnects 830, an antenna dielectric layer 260 and the curved antenna 206. The first dielectric layer 802 may be a core layer. The second dielectric layer 810 is formed over a first surface of the first dielectric layer 802. The third dielectric layer 812 is formed over a second surface of the first dielectric layer 802. The plurality of interconnects 830 may be located and formed in and over the first dielectric layer 802, the second dielectric layer 810, and/or the third dielectric layer 812. The plurality of interconnects 830 may include vias, pads and/or traces. The antenna dielectric layer 260 is located over the surface of the antenna device 800 (e.g., surface of the second dielectric layer 810). The curved antenna 206 is coupled to and formed over the antenna dielectric layer 260. The curved antenna 206 and the antenna dielectric layer 260 may be formed over a dielectric layer of the antenna device 800 in a similar manner as forming a curved antenna 206 over a substrate as described in FIG. 2. The antenna device 800 may include one or more antennas (e.g., curved antennas). The solder resist layer 822 is formed over the third dielectric layer 812. The antenna device 800 may include a plurality of solder interconnects 840. The plurality of solder interconnects 840 is coupled to the plurality of interconnects 830. The dielectric layers (e.g., 802, 810, 812) of the antenna device 800 may be made of the same, similar or different materials than the dielectric layer 220 of the substrate 202. Examples of dielectric layers include organic dielectric materials and/or ceramics. In some implementations, some of the dielectric layers may be considered part of the same dielectric layer.

FIG. 9 illustrates an antenna device 900 that includes a curved antenna. The device 900 includes the same or similar components as the antenna device 800. The antenna device 900 includes the first dielectric layer 802, the second dielectric layer 810, the third dielectric layer 812, the solder resist layer 822, the plurality of interconnects 830, the first antenna dielectric layer 570, the antenna ground interconnect 508, the second antenna dielectric layer 560 and the curved antenna 506. The first antenna dielectric layer 570, the antenna ground interconnect 508, the second antenna dielectric layer 560 and the curved antenna 506 may be formed over a dielectric layer of the antenna device 900 in a similar manner as forming a curved antenna 506 over a substrate as described in FIG. 5. The antenna device 900 may include one or more antennas (e.g., curved antennas).

FIG. 10 illustrates an antenna device 1000 that includes a curved antenna. The device 1000 includes the same or similar components as the antenna device 900. The antenna device 1000 includes the first dielectric layer 802, the second dielectric layer 810, the third dielectric layer 812, the solder resist layer 822, the plurality of interconnects 830, void 670, the antenna ground interconnect 608, the at least one opening 609, the antenna dielectric layer 660 and the curved antenna 506. The void 670, the antenna ground interconnect 608, the at least one opening 609, the antenna dielectric layer 660 and the curved antenna 506 may be formed over a dielectric layer of the antenna device 1000 in a similar manner as forming a curved antenna 506 over a substrate as described in FIG. 6. The antenna device 1000 may include one or more antennas (e.g., curved antenna).

The antenna device (e.g., 800, 900, 1000) may be configured to provide Wireless Fidelity (WiFi) communication and/or cellular communication (e.g., 2G, 3G, 4G, 5G). The first antenna device 750, the second antenna device 760, the third antenna device 770, the fourth antenna device 780, and/or combinations thereof, may be configured to support Global System for Mobile Communications (GSM), Universal Mobile Telecommunications System (UMTS), and/or Long-Term Evolution (LTE).

FIGS. 2, 5, 6, 8, 9, and 10 illustrate examples of what the surface of a substrate may be. However, different implementations may define the surface (e.g., planar surface) of a substrate differently. In some implementations, the surface of a substrate may include the surface of a dielectric layer, the surface of interconnects over the dielectric layer, and/or the surface of a solder resist layer over the interconnects and the dielectric layer.

Exemplary Arrangements of Curved Antennas

Curved antennas may be arranged over a substrate and/or an antenna device differently. FIGS. 11-18 illustrate examples of possible arrangements and/or configurations of curved antennas for a substrate and/or an antenna device.

Figure 12:
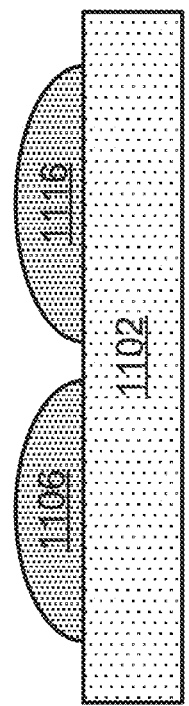
FIG. 12 illustrates a profile view of several exemplary curved antennas.
Figure 11:
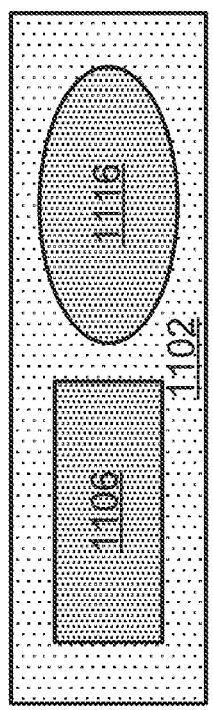
FIG. 11 illustrates a plan view of several exemplary curved antennas.

FIG. 11 illustrates a plan view (e.g., top view) of a curved antenna 1106 and a curved antenna 1116 coupled to and formed over a dielectric layer 1102 (e.g., dielectric layer of a substrate, dielectric layer of an antenna device). FIG. 12 illustrates a profile view of the curved antenna 1106 and the curved antenna 1116. The curved antenna 1106 includes a rectangular footprint over the dielectric layer 1102. The curved antenna 1116 includes an oval footprint over the dielectric layer 1102. The curved antenna 1106 and/or the curved antenna 1116 may include a dome shape (e.g., rectangular dome shape, oval dome shape). A dome shape may include a shape that is half of a sphere.

Figure 14:
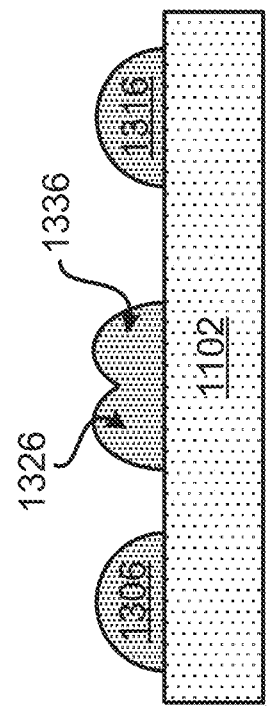
FIG. 14 illustrates a profile view of several exemplary curved antennas.
Figure 13:
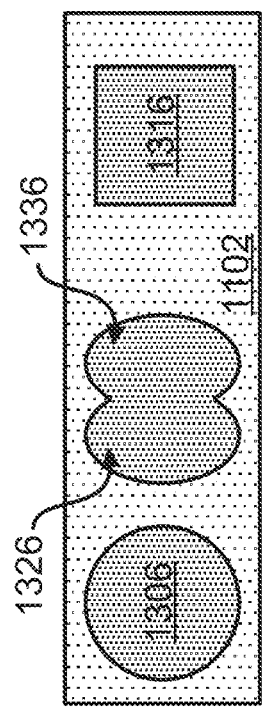
FIG. 13 illustrates a plan view of several exemplary curved antennas.

FIG. 13 illustrates a plan view (e.g., top view) of a curved antenna 1306 and a curved antenna 1316 coupled to and formed over a dielectric layer 1102 (e.g., dielectric layer of a substrate, dielectric layer of an antenna device). FIG. 14 illustrates a profile view of the curved antenna 1306 and the curved antenna 1316. The curved antenna 1306 includes a circular footprint over the dielectric layer 1102. The curved antenna 1316 includes a square footprint over the dielectric layer 1102. The curved antenna 1306 and/or the curved antenna 1316 may include a dome shape (e.g., semi-circle dome shape). FIGS. 13 and 14 also illustrates a curved antenna 1326 and a curved antenna 1336. The curved antenna 1326 and the curved antenna 1336 may be part of the same antenna or may be separate antennas. The curved antenna 1316 and the curved antenna 1336 may collectively have a mixed dome shape.

FIG. 15 illustrates a plan view (e.g., top view) of a curved antenna 1506 and a curved antenna 1516 coupled to and formed over a dielectric layer 1102 (e.g., dielectric layer of a substrate, dielectric layer of an antenna device). FIG. 16 illustrates a profile view of the curved antenna 1506 and the curved antenna 1516. The curved antenna 1506 and the curved antenna 1516 may be part of the same antenna or may be separate antennas. The curved antenna 1506 and the curved antenna 1516 may collectively have a mixed dome shape.

FIG. 17 illustrates a plan view (e.g., top view) of a curved antenna 1706 and an antenna 1716 coupled to and formed over a dielectric layer 1102 (e.g., dielectric layer of a substrate, dielectric layer of an antenna device). FIG. 18 illustrates a profile view of the curved antenna 1706 and the antenna 1716. The curved antenna 1106 includes an oval footprint over the dielectric layer 1102. The antenna 1716 includes a rectangular footprint over the dielectric layer 1102. The curved antenna 1706 may include a dome shape. The antenna 1716 may include a flat antenna without any vertical offset from the surface of the dielectric layer 1102. For example, the antenna 1716 is touching the surface of the dielectric layer 1102.

The arrangements of antennas shown in FIGS. 11-18 are exemplary. Different implementations may include different arrangements with different combinations and/or different numbers of antennas (e.g., different numbers of curved antennas). Examples of arrangements include a 1×4 array of antennas (e.g., curved antennas, flat antennas). The 1×4 array may be configured to be implemented for 5G millimeter (mm) wave application. For example, the 1×4 array may be configured for receiving and/or transmitting 5G millimeter wave signals. The 1×4 array may be implemented in a 5G mm wave radio frequency front end (RFFE) package.

Exemplary Sequence for Fabricating a Curved Antenna

Figure 19:
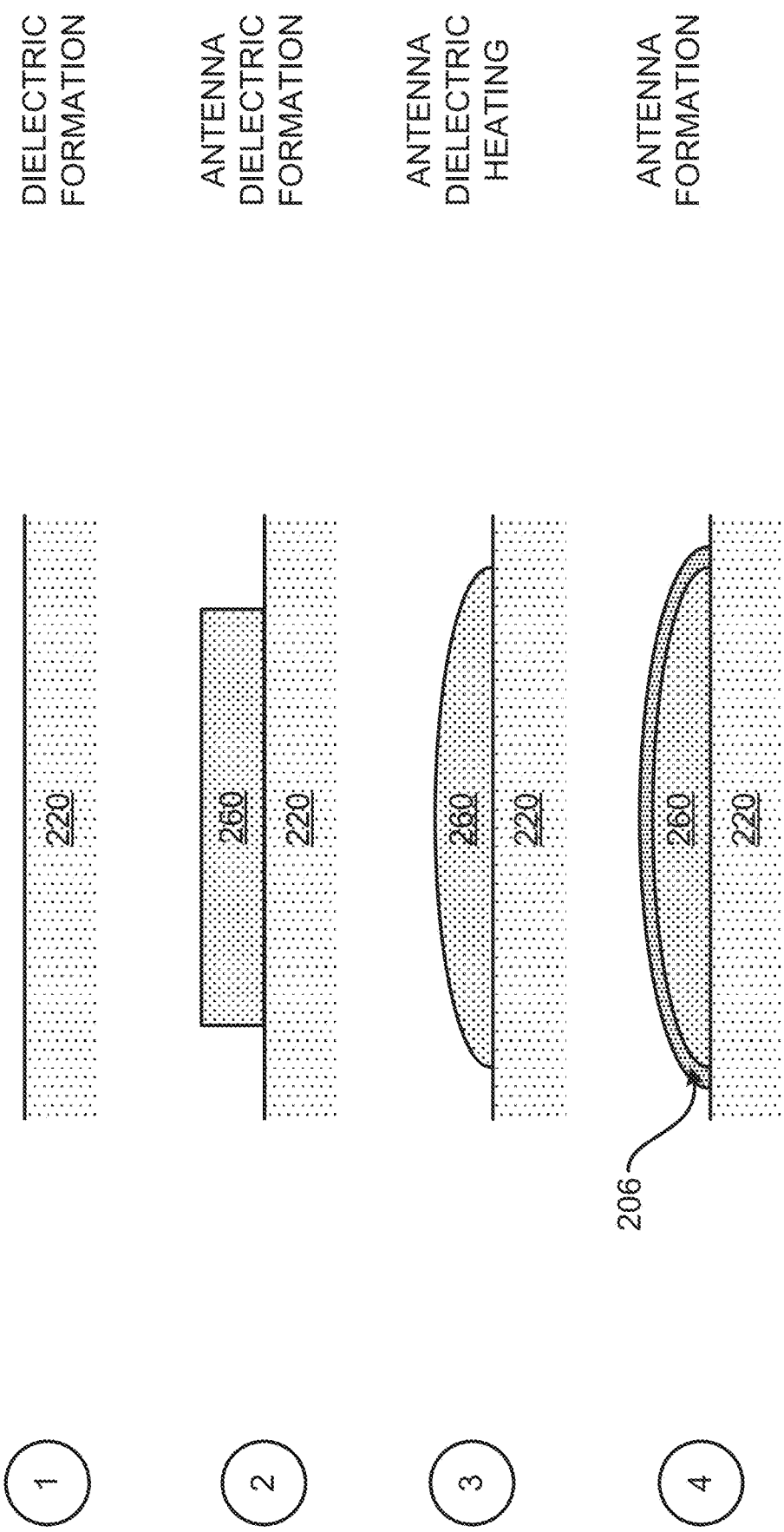
FIG. 19 illustrates an exemplary sequence for fabricating a curved antenna.

FIG. 19 illustrates an exemplary sequence for providing or fabricating a curved antenna. In some implementations, the sequence of FIG. 19 may be used to provide or fabricate the curved antenna 206 of FIG. 2 and/or FIG. 8, or any of the curved antennas described in the disclosure.

It should be noted that the sequence of FIG. 19 may combine one or more stages in order to simplify and/or clarify the sequence for providing or fabricating the curved antenna. In some implementations, the order of the processes may be changed or modified. In some implementations, one or more of processes may be replaced or substituted without departing from the spirit of the disclosure.

Stage 1, as shown in FIG. 19, illustrates a state after a dielectric layer 220 is provided. The dielectric layer 220 may be a dielectric layer of a substrate or an antenna device. The dielectric layer 220 may include a prepreg or polyimide. However, the dielectric layer 220 may include other materials.

Stage 2 illustrates a state after an antenna dielectric layer 260 is formed over a surface of the dielectric layer 220. A deposition process may be used to form the antenna dielectric layer 260. The antenna dielectric layer 260 may include a polymer (e.g., solvent rich polymer layer).

Stage 3 illustrates a state after the antenna dielectric layer 260 is heated to form the antenna dielectric layer 260 that includes a curved contour shape (e.g., dome shape, non-linear shape).

Stage 4 illustrates a state after the curved antenna 206 is formed over and coupled to the curved contour of the antenna dielectric layer 260. A deposition process, a patterning process and/or a plating process may be used to form the curved antenna 206. For example, a semi-additive process (SAP) may be used to form the curved antenna 206, which may deposit copper, nickel, and/or gold to form the curved antenna 206. In another example, a subtractive process may be used to deposit and pattern the metal that forms the curved antenna 206. The curved antenna 206 takes the shape of the curved contour of the antenna dielectric layer 260. The curved antenna 206 may be formed such that the curved antenna 206 is coupled to one or more interconnects in and/or over the dielectric layer 220. The curved antenna 206 may be located over a surface of the dielectric layer 220.

Exemplary Sequence for Fabricating a Curved Antenna

Figure 20:
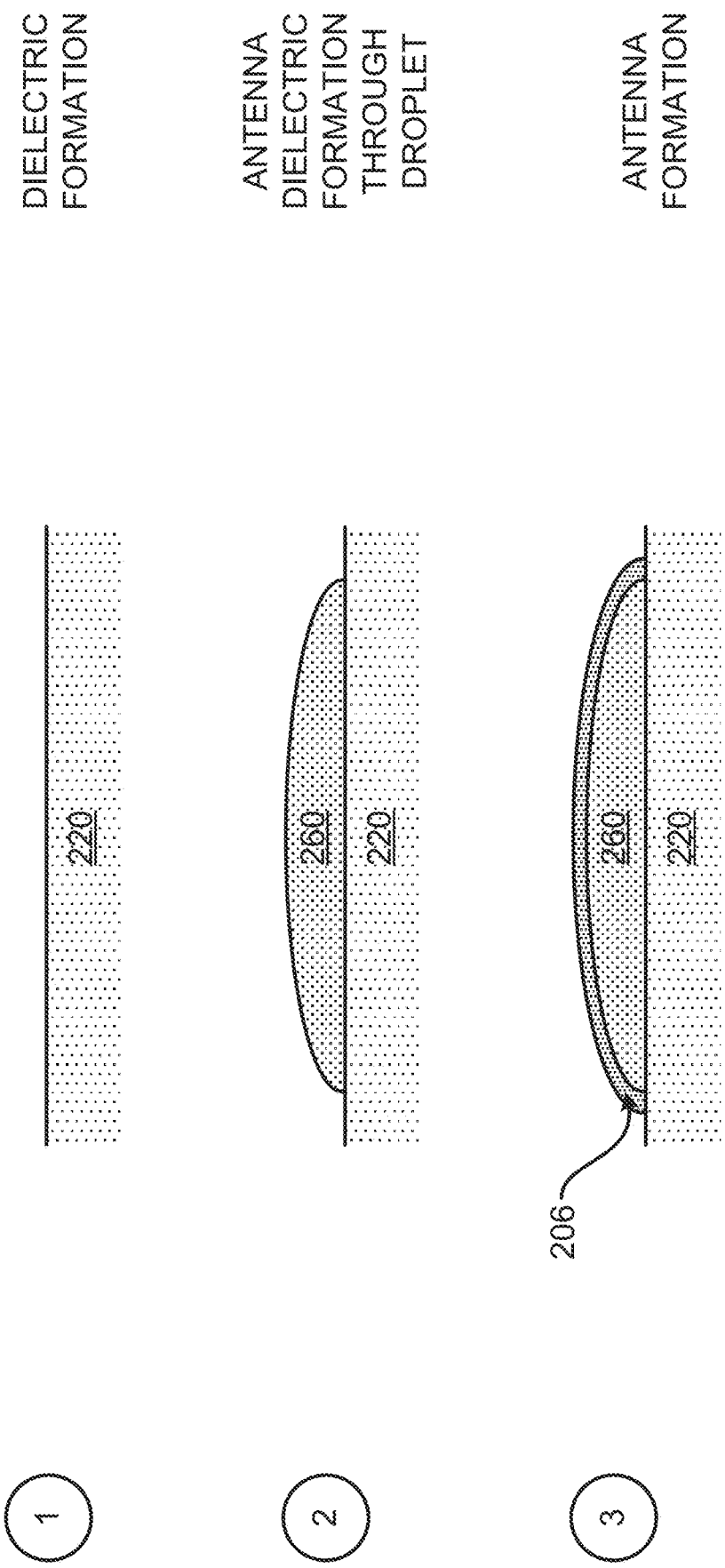
FIG. 20 illustrates another exemplary sequence for fabricating a curved antenna.

Different implementations may fabricate the curved antenna differently. FIG. 20 illustrates another exemplary sequence for providing or fabricating a curved antenna. In some implementations, the sequence of FIG. 20 may be used to provide or fabricate the curved antenna 206 of FIG. 2 and/or FIG. 8, or any of the curved antennas described in the disclosure.

It should be noted that the sequence of FIG. 20 may combine one or more stages in order to simplify and/or clarify the sequence for providing or fabricating the curved antenna. In some implementations, the order of the processes may be changed or modified. In some implementations, one or more of processes may be replaced or substituted without departing from the spirit of the disclosure.

Stage 1, as shown in FIG. 20, illustrates a state after a dielectric layer 220 is provided. The dielectric layer 220 may be a dielectric layer of a substrate or an antenna device. The dielectric layer 220 may include a prepreg or polyimide. However, the dielectric layer 220 may be other materials.

Stage 2 illustrates a state after the antenna dielectric layer 260 is formed over a surface of the dielectric layer 220. A direct patterning process (e.g., nozzle drop, showerhead) may be used to form the antenna dielectric layer 260. The antenna dielectric layer 260 may be cured after the direct patterning. The direct patterning and curing of the antenna dielectric layer 260 may form the curved contour shape (e.g., dome shape, non-linear contour shape) of the antenna dielectric layer 260.

Stage 3 illustrates a state after the curved antenna 206 is formed over and coupled to the curved contour of the antenna dielectric layer 260. A deposition process, a patterning process and/or a plating process may be used to form the curved antenna 206. For example, a semi-additive process (SAP) may be used to form the curved antenna 206, which may deposit copper, nickel, and/or gold to form the curved antenna 206. In another example, a subtractive process may be used to deposit and pattern the metal that forms the curved antenna 206. The curved antenna 206 takes the shape of the curved contour of the antenna dielectric layer 260. The curved antenna 206 may be formed such that the curved antenna 206 is coupled to one or more interconnects in and/or over the dielectric layer 220. The curved antenna 206 may be located over a surface of the dielectric layer 220.

Exemplary Sequence for Fabricating a Curved Antenna

Figure 21A:
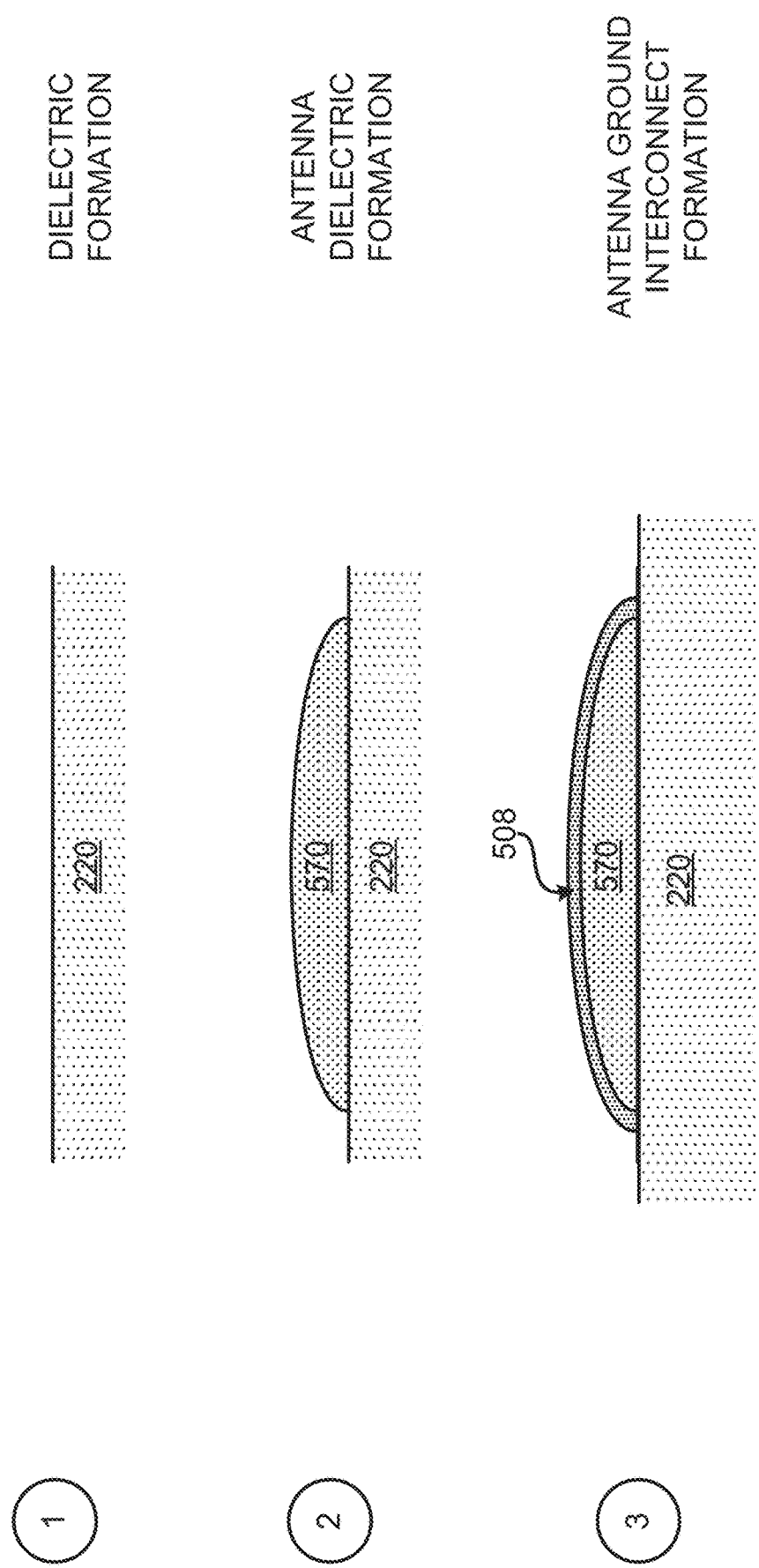
FIGS. 21A-21B illustrate an exemplary sequence for fabricating a curved antenna.
Figure 21B:
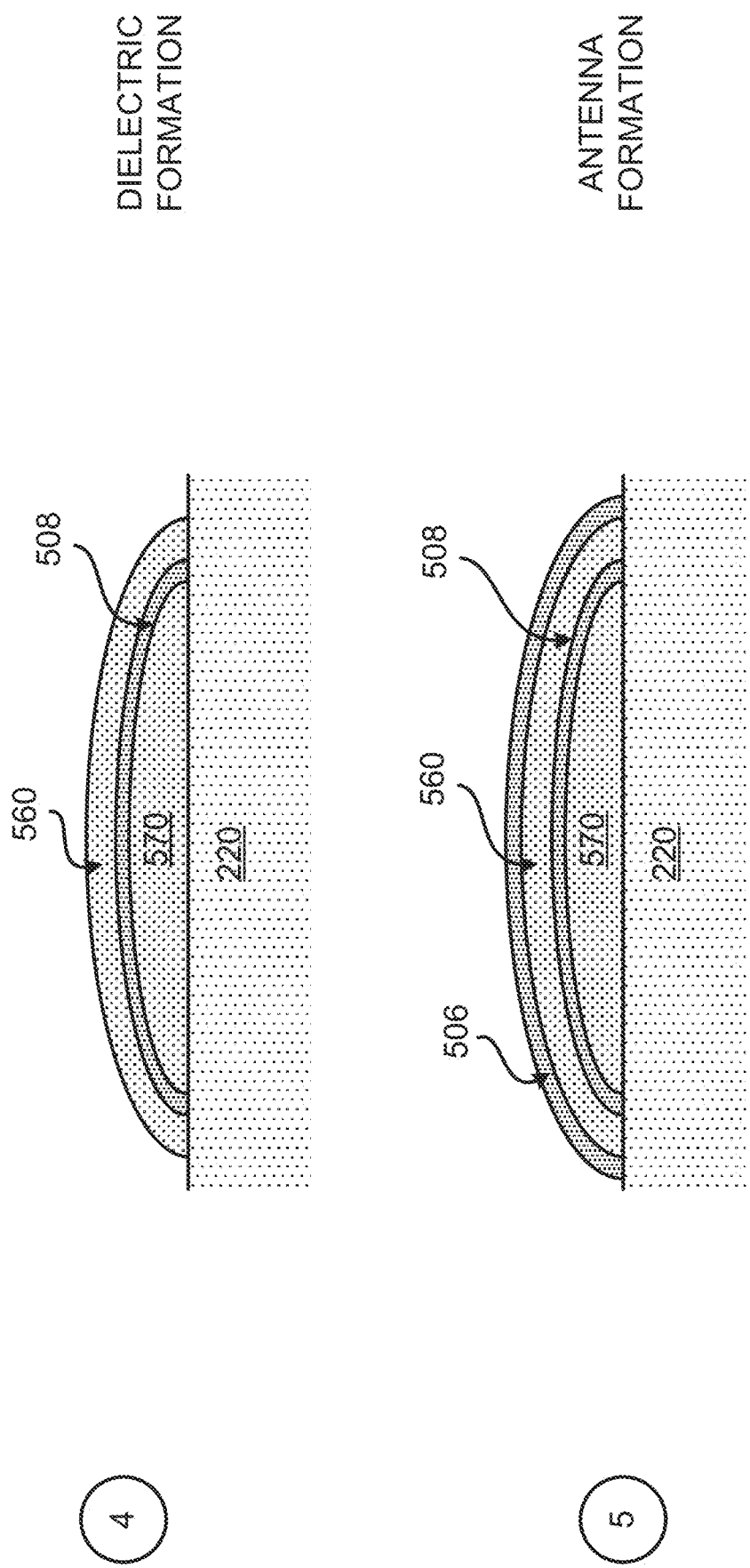

FIGS. 21A-21B illustrate another exemplary sequence for providing or fabricating a curved antenna. In some implementations, the sequence of FIGS. 21A-21B may be used to provide or fabricate the curved antenna 506 of FIG. 5 and/or FIG. 9, or any of the curved antennas described in the disclosure.

It should be noted that the sequence of FIGS. 21A-21B may combine one or more stages in order to simplify and/or clarify the sequence for providing or fabricating the curved antenna. In some implementations, the order of the processes may be changed or modified. In some implementations, one or more of processes may be replaced or substituted without departing from the spirit of the disclosure.

Stage 1, as shown in FIG. 21A, illustrates a state after a dielectric layer 220 is provided. The dielectric layer 220 may be a dielectric layer of a substrate or an antenna device. The dielectric layer 220 may include a prepreg or polyimide. However, the dielectric layer 220 may be other materials.

Stage 2 illustrates a state after the first antenna dielectric layer 570 is formed over a surface of the dielectric layer 220. The first antenna dielectric layer 570 may be formed differently. FIGS. 19 and 20 illustrate and describe different methods for forming an antenna dielectric layer. A deposition process and heating process may be used to form the antenna dielectric layer, as described in FIG. 19, or a direct patterning process (e.g., nozzle drop, showerhead) may be used to form the antenna dielectric layer, as described in FIG. 20.

Stage 3 illustrates a state after the antenna ground interconnect 508 is formed over and coupled to the curved contour of the first antenna dielectric layer 570. A deposition process, a patterning process and/or a plating process may be used to form the curved antenna ground interconnect 508. For example, a semi-additive process (SAP) may be used to form the antenna ground interconnect 508, which may deposit copper, nickel, and/or gold to form the antenna ground interconnect 508. In another example, a subtractive process may be used to deposit and pattern the metal that forms the antenna ground interconnect 508. The antenna ground interconnect 508 takes the shape of the curved contour of the antenna dielectric layer 570. The antenna ground interconnect 508 may be formed such that the antenna ground interconnect 508 is coupled to one or more interconnects in and/or over the dielectric layer 220. The antenna ground interconnect 508 may be located over a surface of the dielectric layer 220. The antenna ground interconnect 508 may be configured to be coupled to ground.

Stage 4, as shown in FIG. 21B, illustrates a state after the second antenna dielectric layer 560 is formed over a surface of the antenna ground interconnect 508. The second antenna dielectric layer 560 may be formed differently. FIGS. 19 and 20 illustrate and describe different methods for forming an antenna dielectric layer. A deposition process and heating process may be used to form the antenna dielectric layer, as described in FIG. 19, or a direct patterning process (e.g., nozzle drop, showerhead) may be used to form the antenna dielectric layer, as described in FIG. 20.

Stage 5 illustrates a state after the curved antenna 506 is formed over and coupled to the curved contour of the second antenna dielectric layer 560. A deposition process, a patterning process and/or a plating process may be used to form the curved antenna 506. For example, a semi-additive process (SAP) may be used to form the curved antenna 506, which may deposit copper, nickel, and/or gold to form the curved antenna 506. In another example, a subtractive process may be used to deposit and pattern the metal that forms the curved antenna 506. The curved antenna 506 takes the shape of the curved contour of the antenna dielectric layer 560. The curved antenna 506 may be formed such that the curved antenna 506 is coupled to one or more interconnects in and/or over the dielectric layer 220. The curved antenna 506 may be located over the dielectric layer 220.

Exemplary Sequence for Fabricating a Curved Antenna

Figure 22A:
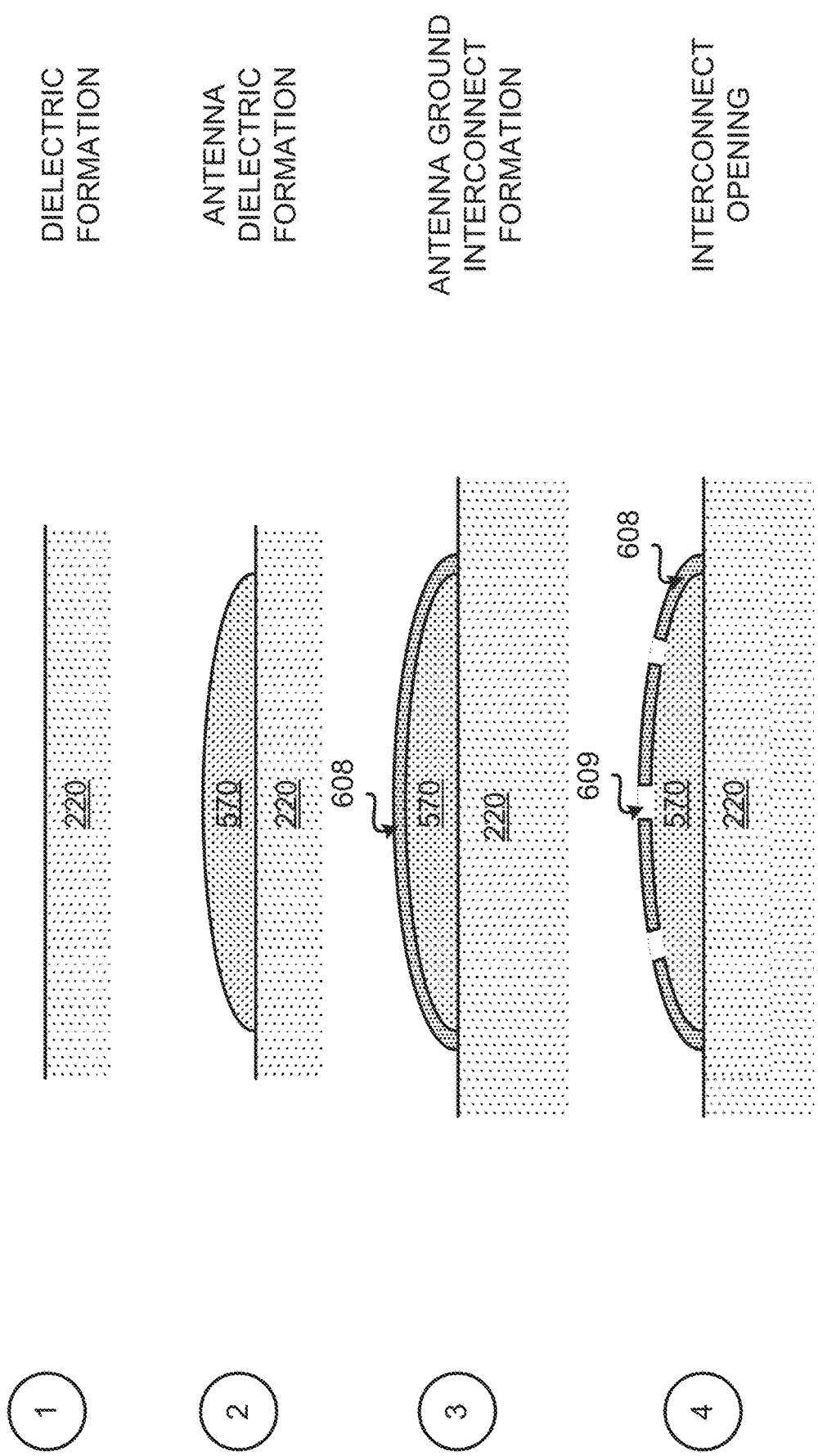
FIGS. 22A-22B illustrate an exemplary sequence for fabricating a curved antenna.
Figure 22B:
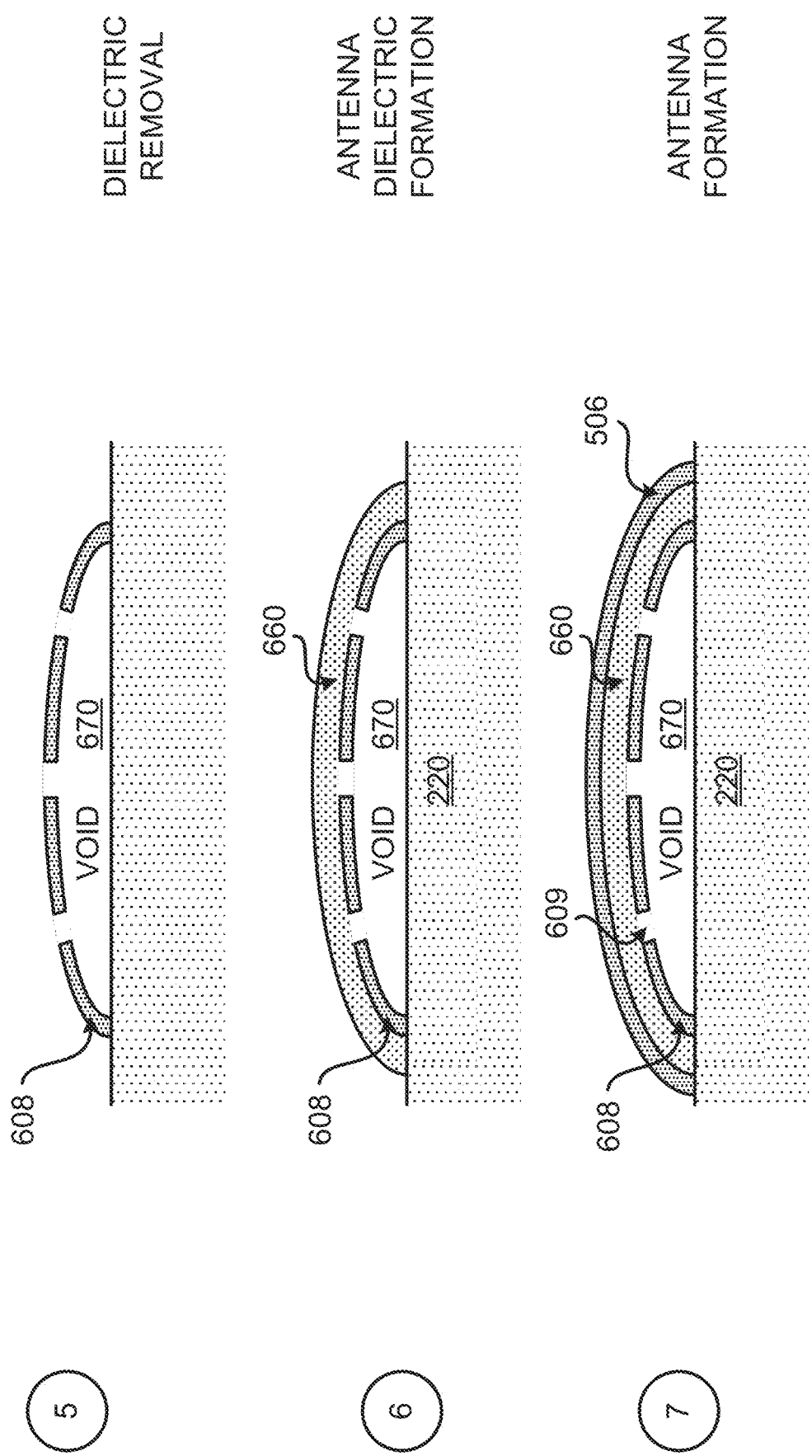

FIGS. 22A-22B illustrate another exemplary sequence for providing or fabricating a curved antenna. In some implementations, the sequence of FIGS. 22A-22B may be used to provide or fabricate the curved antenna 506 of FIG. 6 and/or FIG. 10, or any of the curved antennas described in the disclosure.

It should be noted that the sequence of FIGS. 22A-22B may combine one or more stages in order to simplify and/or clarify the sequence for providing or fabricating the curved antenna. In some implementations, the order of the processes may be changed or modified. In some implementations, one or more of processes may be replaced or substituted without departing from the spirit of the disclosure.

Stage 1, as shown in FIG. 22A, illustrates a state after a dielectric layer 220 is provided. The dielectric layer 220 may be a dielectric layer of a substrate or an antenna device. The dielectric layer 220 may include a prepreg or polyimide. However, the dielectric layer 220 may be other materials.

Stage 2 illustrates a state after the first antenna dielectric layer 570 is formed over a surface of the dielectric layer 220. The first antenna dielectric layer 570 may be formed differently. FIGS. 19 and 20 illustrate and describe different methods for forming an antenna dielectric layer. A deposition process and heating process may be used to form the antenna dielectric layer, as described in FIG. 19, or a direct patterning process (e.g., nozzle drop, showerhead) may be used to form the antenna dielectric layer, as described in FIG. 20.

Stage 3 illustrates a state after the antenna ground interconnect 608 is formed over and coupled to the curved contour of the first antenna dielectric layer 570. A deposition process, a patterning process and/or a plating process may be used to form the curved antenna ground interconnect 608. For example, a semi-additive process (SAP) may be used to form the antenna ground interconnect 608, which may deposit copper, nickel, and/or gold to form the antenna ground interconnect 608. In another example, a subtractive process may be used to deposit and pattern the metal that forms the antenna ground interconnect 608. The antenna ground interconnect 608 takes the shape of the curved contour of the antenna dielectric layer 570. The antenna ground interconnect 608 may be formed such that the antenna ground interconnect 608 is coupled to one or more interconnects in and/or over the dielectric layer 220. The antenna ground interconnect 608 may be located over the dielectric layer 220.

Stage 4 illustrates a state after at least one opening 609 is formed in the antenna ground interconnect 608. The at least one opening 609 may be formed using a laser process (e.g., laser ablation). The at least one opening 609 may travel through the antenna ground interconnect 608.

Stage 5, as shown in FIG. 22B, illustrates a state after at least some portions of the first antenna dielectric layer 570 is removed, leaving a void 670 between the dielectric layer 220 and the antenna ground interconnect 608. It is noted that not all of the first antenna dielectric layer 570 may be removed. As such, there may be a combination of the void 670 and the first antenna dielectric layer 570 between the dielectric layer 220 and the antenna ground interconnect 608. Different implementations may remove at least part of the antenna dielectric layer 570 differently. For example, at least part of the antenna dielectric layer 570 may be dissolved.

Stage 6 illustrates a state after the antenna dielectric layer 660 is formed over a surface of the antenna ground interconnect 608. The antenna dielectric layer 660 may be formed differently. The size of the opening 609 may be sufficiently small enough that the antenna dielectric layer 660 may not travel through the at least one opening 609. However, in some implementations, some portions of the antenna dielectric layer 660 may travel through the at least one opening 609 and form in the void 670. FIGS. 19 and 20 illustrate and describe different methods for forming an antenna dielectric layer. A deposition process and heating process may be used to form the antenna dielectric layer, as described in FIG. 19, or a direct patterning process (e.g., nozzle drop, showerhead) may be used to form the antenna dielectric layer, as described in FIG. 20.

Stage 7 illustrates a state after the curved antenna 506 is formed over and coupled to the curved contour of the antenna dielectric layer 660. A deposition process, a patterning process and/or a plating process may be used to form the curved antenna 506. For example, a semi-additive process (SAP) may be used to form the curved antenna 506, which may deposit copper, nickel, and/or gold to form the curved antenna 506. In another example, a subtractive process may be used to deposit and pattern the metal that forms the curved antenna 506. The curved antenna 506 takes the shape of the curved contour of the antenna dielectric layer 660. The curved antenna 506 may be formed such that the curved antenna 506 is coupled to one or more interconnects in and/or over the dielectric layer 220. The curved antenna 506 may be located over a surface of the dielectric layer (e.g., surface of a substrate, surface of an antenna device).

Exemplary Flow Diagram of a Method for Fabricating a Curved Antenna

Figure 23:
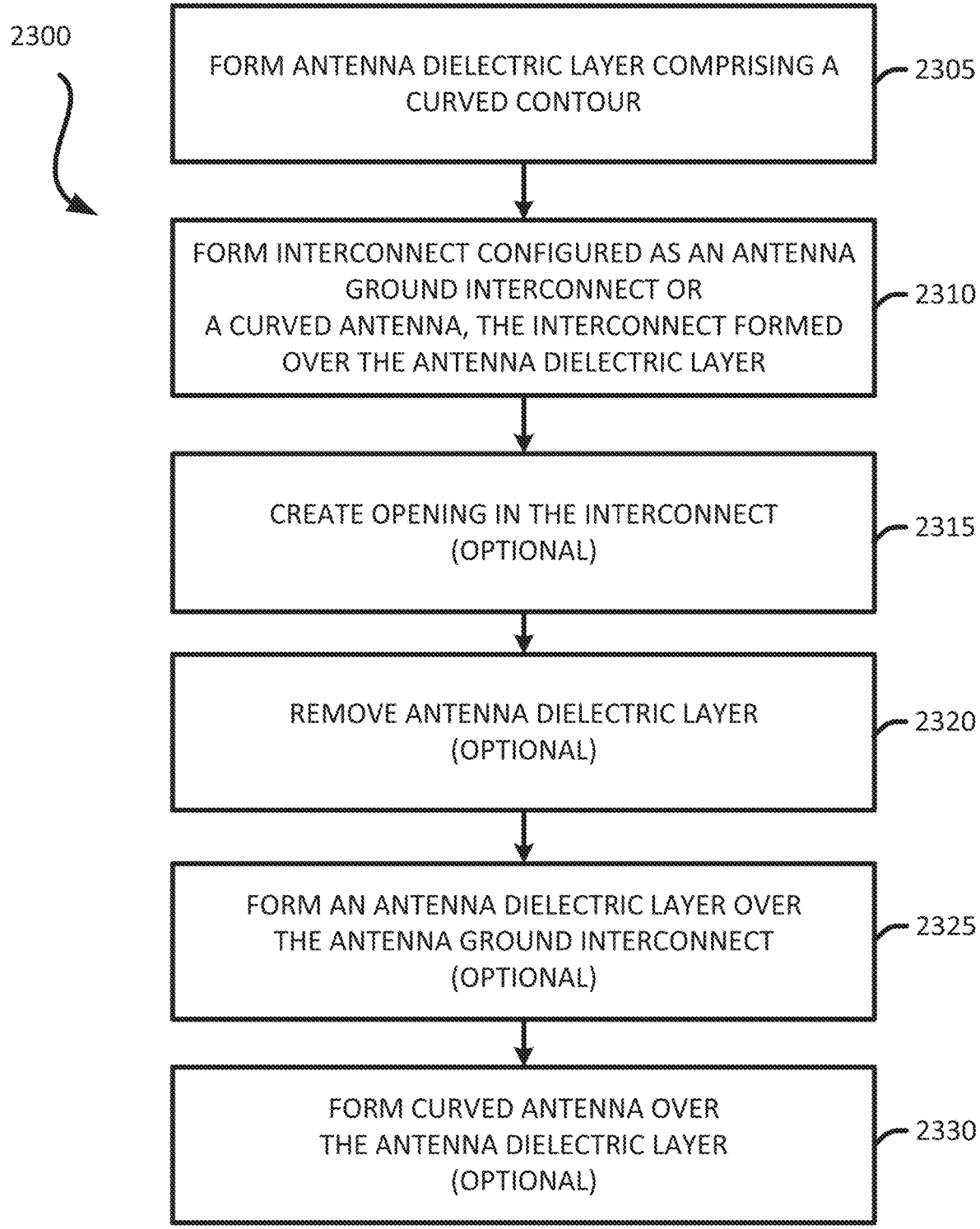
FIG. 23 illustrates an exemplary flow diagram of a method for fabricating a curved antenna.

In some implementations, fabricating a curved antenna includes several processes. FIG. 23 illustrates an exemplary flow diagram of a method 2300 for providing or fabricating a curved antenna. In some implementations, the method 2300 of FIG. 23 may be used to provide or fabricate the curved antennas 206 or 506 described in the disclosure. The method may be used to provide or fabricate curved antennas for a substrate and/or an antenna device. However, the method 2300 may be used to provide or fabricate any of the curved antennas described in the disclosure.

It should be noted that the method of FIG. 23 may combine one or more processes in order to simplify and/or clarify the method for providing or fabricating a curved antenna. In some implementations, the order of the processes may be changed or modified.

The method forms (at 2305) an antenna dielectric layer (e.g., 260, 570) comprising a curved contour shape. Different implementations may form the antenna dielectric layer differently. The antenna dielectric layer may be formed over and coupled to a surface of a dielectric layer (e.g., dielectric layer of a substrate, dielectric layer of an antenna device). FIGS. 19 and 20 illustrate and describe different methods for forming an antenna dielectric layer. A deposition process and heating process may be used to form the antenna dielectric layer, as described in FIG. 19, or a direct patterning process (e.g., nozzle drop, showerhead) may be used to form the antenna dielectric layer, as described in FIG. 20.

The method forms (at 2310) an interconnect that is configured as an antenna ground interconnect (e.g., 508, 608) or a curved antenna (e.g., 206). The antenna ground interconnect (e.g., 508, 608) or a curved antenna (e.g., 206) may be formed over the antenna dielectric layer (e.g., 260, 570). The antenna ground interconnect may have curved shape. A deposition process, a patterning process and/or a plating process may be used to form the curved antenna ground interconnect (e.g., 508, 608). For example, a semi-additive process (SAP) may be used to form the antenna ground interconnect, which may deposit copper, nickel, and/or gold to form the antenna ground interconnect. In another example, a subtractive process may be used to deposit and pattern the metal that forms the antenna ground interconnect. The same process or a similar process may be used to form the curved antenna. Stage 4 of FIG. 19 and Stage 3 FIGS. 20, 21A and 22B illustrate examples of forming an antenna ground interconnect or a curved antenna. When the method forms the curved antenna (e.g., 206), the method may stop forming any further antenna dielectric layer or antenna interconnect.

The method may optionally (at 2315) form at least one opening (e.g., 609) in the antenna ground interconnect (e.g., 608). The at least one opening 609 may be formed using a laser process (e.g., laser ablation). Stage 4 of FIG. 22A illustrates an example of forming at least one opening in the antenna ground interconnect.

The method may optionally remove (at 2320) at least some of the antenna dielectric layer (e.g., 570) to create a void (e.g., 670) between the antenna ground interconnect and a dielectric layer of the substrate or the antenna device. Different implementations may remove the antenna dielectric layer differently. For example, at least part of the antenna dielectric layer 570 may be dissolved or descummed Stage 5 of FIG. 22B illustrates an example of removing at least some portions of an antenna dielectric layer.

The method forms (at 2325) an antenna dielectric layer (e.g., 560) comprising a curved contour. Different implementations may form the antenna dielectric layer differently. The antenna dielectric layer may be formed over and coupled to an antenna ground interconnect (e.g., 508, 608). FIGS. 19 and 20 illustrate and describe different methods for forming an antenna dielectric layer. A deposition process and heating process may be used to form the antenna dielectric layer, as described in FIG. 19, or a direct patterning process (e.g., nozzle drop, showerhead) may be used to form the antenna dielectric layer, as described in FIG. 20. It is noted that forming (at 2325) the antenna dielectric layer may be optional when the interconnect formed at 2310 is configured as an antenna.

The method forms (at 2330) a curved antenna (e.g., 506). The curved antenna (e.g., 506) may be formed over the antenna dielectric layer (e.g., 560). A deposition process, a patterning process and/or a plating process may be used to form the curved antenna (e.g., 506). For example, a semi-additive process (SAP) may be used to form the curved antenna, which may deposit copper, nickel, and/or gold to form the curved antenna. In another example, a subtractive process may be used to deposit and pattern the metal that forms the curved antenna. Stage 5 of FIG. 21B and Stage 7 FIG. 22B illustrate examples of forming a curved antenna. It is noted that forming (at 2330) the curved antenna may be optional when the interconnect formed at 2310 is configured as an antenna.

Exemplary Sequence for Fabricating an Antenna Device Comprising a Curved Antenna FIGS. 24A-24D illustrate an exemplary sequence for providing or fabricating a discrete antenna device. In some implementations, the sequence of FIGS. 24A-24D may be used to provide or fabricate the antenna device 800 of FIG. 8, or any of the antenna devices described in the disclosure.

It should be noted that the sequence of FIGS. 24A-24D may combine one or more stages in order to simplify and/or clarify the sequence for providing or fabricating the antenna device. In some implementations, the order of the processes may be changed or modified. In some implementations, one or more of processes may be replaced or substituted without departing from the spirit of the disclosure.

Stage 1, as shown in FIG. 24A, illustrates a state after a first dielectric layer 802 is provided. The first dielectric layer 802 may be a core layer. The first dielectric layer 802 may be silicon, glass, quartz, or combinations thereof.

Stage 2, illustrates a state after one or more cavities 2401 are formed in the first dielectric layer 802. A laser process or a photo etching process may be used to form the cavities 2401 in the first dielectric layer 802.

Stage 3 illustrates a state after a plurality of interconnects 2402 is formed in and over the first dielectric layer 802. A plating process may be used to form the plurality of interconnects 2402. The plurality of interconnects 2402 may include traces, vias and/or pads. The plurality of interconnects 2402 may include one or more metal layers (e.g., seed layer+metal layer).

Stage 4, as shown in FIG. 24B, illustrates a state after a second dielectric layer 810 is formed over a first surface of the first dielectric layer 802, and after a third dielectric layer 812 is formed over a second surface of the first dielectric layer 802. A lamination process may be used to form the second dielectric layer 810 and the third dielectric layer 812. The second dielectric layer 810 and/or the third dielectric layer 812 may be a photo-etchable dielectric layer.

Stage 5, illustrates a state after one or more cavities 2403 are formed in the third dielectric layer 812. A laser process or a photo etching process may be used to form the cavities 2403 in the third dielectric layer 812.

Figure 24C:
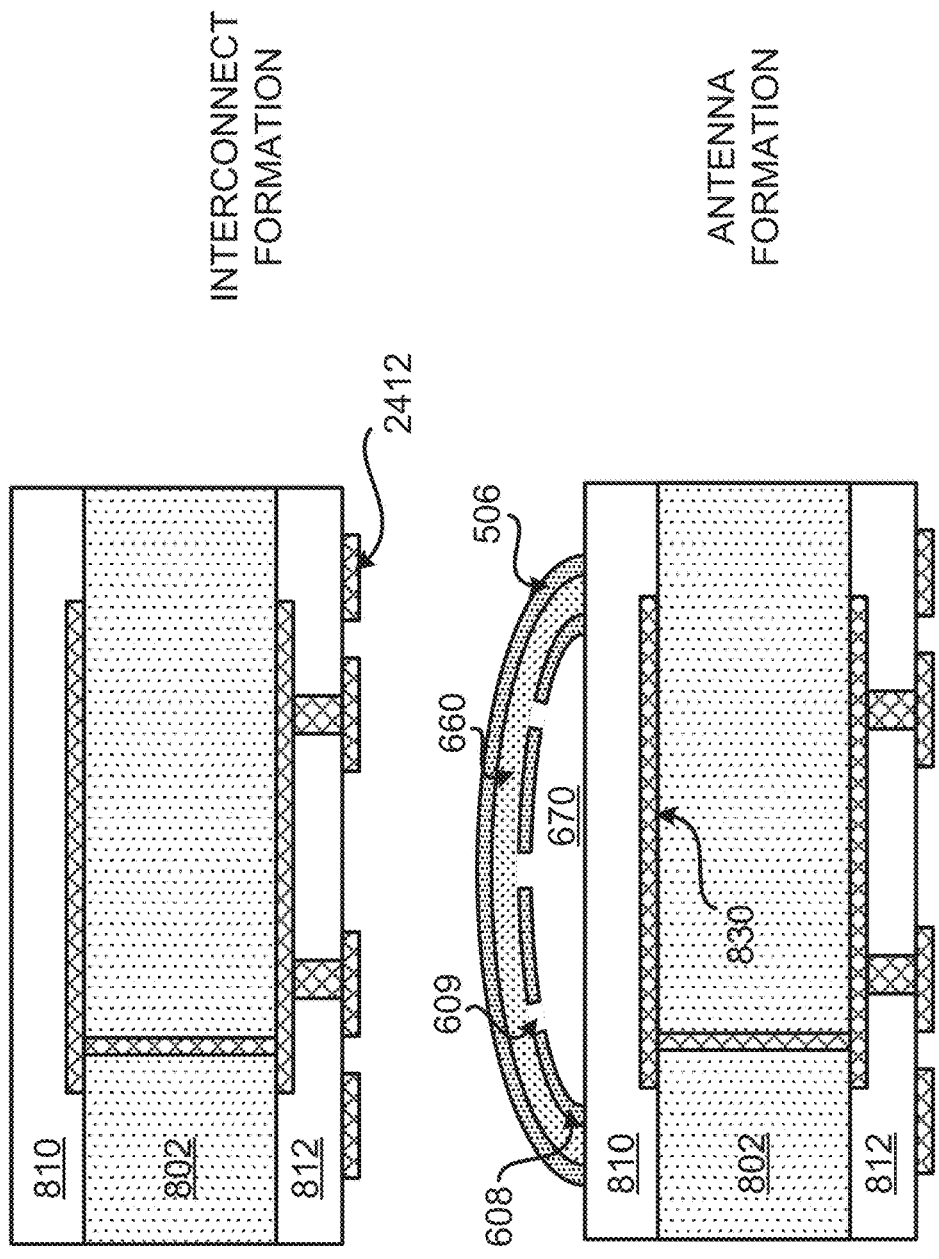

Stage 6, as shown in FIG. 24C, illustrates a state after a plurality of interconnects 2412 are formed in and over the third dielectric layer 812. A plating process may be used to form the plurality of interconnects 2412. The plurality of interconnects 2412 may include traces, vias and/or pads. The plurality of interconnects 2412 may include one or more metal layers (e.g., seed layer+metal layer). It is noted that interconnects may be formed in and/or over the second dielectric layer 810.

Stage 7 illustrates a state after a curved antenna 506 is formed over the dielectric layer 810. In addition to the curved antenna 506, a void 670, an antenna ground interconnect 608, an antenna dielectric layer 660 and at least one opening 609 may be formed over the dielectric layer 810. FIGS. 22A-22B illustrate an example of forming the curved antenna 506, the void 670, the antenna ground interconnect 608, the antenna dielectric layer 660 and the at least one opening 609. Different implementations may form different configurations of the curved antenna. For example, the curved antennas described in FIGS. 19, 20 and/or 21A-21B may be formed over the dielectric layer 810.

Figure 24D:
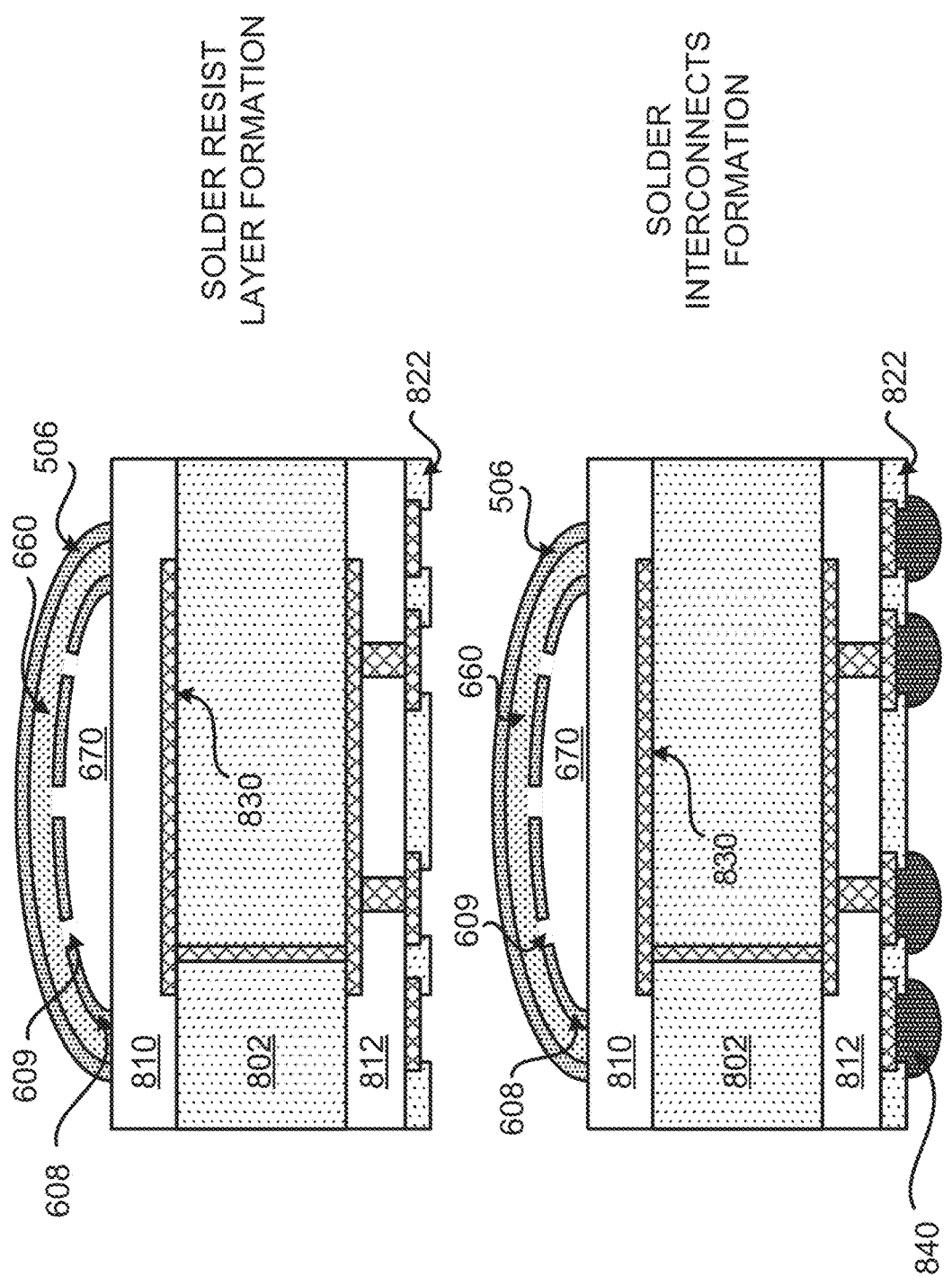

Stage 8, as shown in FIG. 24D, illustrates a state after solder resist layer 822 is formed over the third dielectric layer 812. A deposition process may be used to form the solder resist layer.

Stage 9, as shown in FIG. 24D, illustrates a state a plurality of solder interconnects 840 is provided in the cavities of the second solder resist layer 822. The plurality of solder interconnects 840 may be coupled to the plurality of interconnects 830 through a reflow process. The plurality of interconnects 830 may represent the plurality of interconnects 2402 and 2412. Stages 8 and/or 9 may illustrate the antenna device 800 of FIG. 8.

FIGS. 24A-24D illustrate an example of a sequence for fabricating an antenna device. However, different implementations may use a different process and/or a sequence for forming the interconnects. In some implementations, a chemical vapor deposition (CVD) process and/or a physical vapor deposition (PVD) process may be used to form the interconnects. A sputtering process, a spray coating, and/or a plating process may be used to form the interconnects.

Exemplary Flow Diagram of a Method for Fabricating a Discrete Antenna Device

Figure 25:
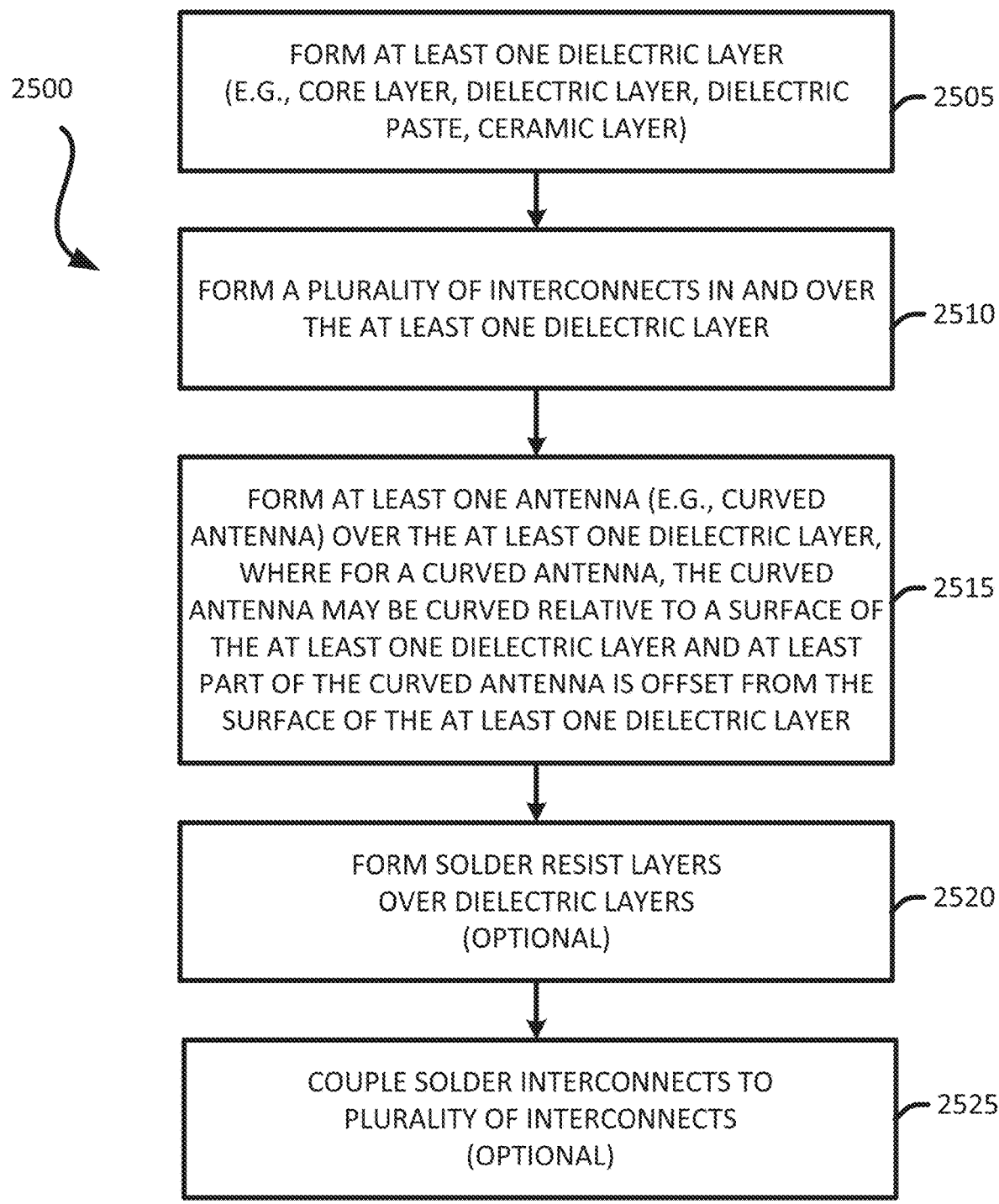
FIG. 25 illustrates an exemplary flow diagram of a method for fabricating a discrete antenna device that includes a curved antenna.

In some implementations, fabricating a discrete antenna device includes several processes. FIG. 25 illustrates an exemplary flow diagram of a method 2500 for providing or fabricating a discrete antenna device. In some implementations, the method 2500 of FIG. 25 may be used to provide or fabricate the antenna device 800 of FIG. 8 described in the disclosure. However, the method 2500 may be used to provide or fabricate any of the antenna device described in the disclosure.

It should be noted that the sequence of FIG. 25 may combine one or more processes in order to simplify and/or clarify the method for providing or fabricating an antenna device. In some implementations, the order of the processes may be changed or modified.

The method forms (at 2505) one or more dielectric layers (e.g., 802, 810, 812). Depending on the type of antenna device that is being fabricated, the dielectric layers may include a core layer and/or a ceramic layer. Forming dielectric layers may include a deposition process, a lamination process and/or include providing one or more dielectric films.

The method forms (at 2510) a plurality of interconnects (e.g., 2402, 2412) in and over the dielectric layers (e.g., 802, 810, 812). A plating process may be used to form the interconnects. However, other processes may be used to form the interconnects. In some implementations, a chemical vapor deposition (CVD) process and/or a physical vapor deposition (PVD) process may be used to forms the interconnects. Moreover, a sputtering process, a pasting process, and/or a spray coating may be used to form the interconnects. In some implementations, the plurality of interconnects may be formed after each dielectric layer is formed. Stages 1-6 of FIGS. 24A-24C illustrate and describe examples of forming a dielectric layer and a plurality of interconnects.

The method forms (at 2515) at least one curved antenna. Different implementations may form different curved antenna designs and configurations. The curved antenna may be curved relative to the surface of the at least one dielectric layer. At least part of the curved antenna is offset (e.g., vertically offset) from the surface of the at least one dielectric layer. FIGS. 19, 20, 21A-21B and 22A-22B illustrate and describe different examples of forming at least one curved antenna.

The method may optionally form (at 2520) solder resist layers (e.g., 822) over the dielectric layers (e.g., 810, 812). A deposition process may be used to form the solder resist layer. Stage 8 of FIG. 24D illustrates an example of forming a solder resist layer.

The method may optionally couple (at 2525) a plurality of solder interconnects (e.g., 840) to the plurality of interconnects (e.g., 830). A reflow process may be used to couple the plurality of solder interconnects to the plurality of interconnects. Stage 9 of FIG. 24D illustrates an example of solder interconnects coupled to interconnects of an antenna device.

In some implementations, several antenna devices are formed over a wafer and/or a carrier. In such instances, the wafer or carrier is cut (e.g., singulated, diced) into several discrete antenna devices. The wafer or carrier may be cut using a mechanical process (e.g., saw) and/or a laser process (e.g., laser ablation).

Exemplary Electronic Devices

Figure 26:
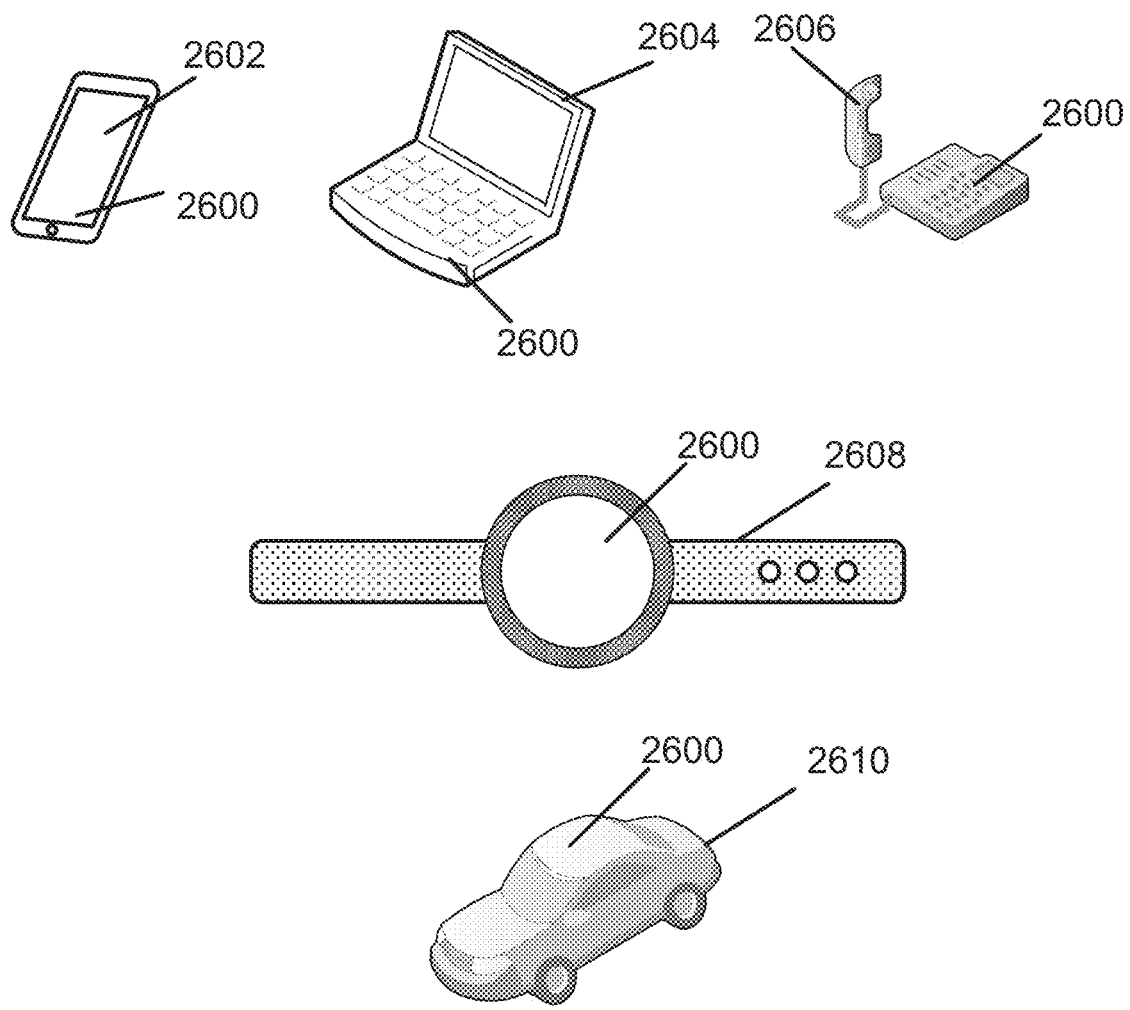
FIG. 26 illustrates various electronic devices that may integrate a die, an integrated device, an integrated passive device (IPD), a passive component, a package, a substrate and/or a device package described herein.

FIG. 26 illustrates various electronic devices that may be integrated with any of the aforementioned device, integrated device, integrated circuit (IC) package, integrated circuit (IC) device, semiconductor device, integrated circuit, die, interposer, package, package-on-package (PoP), System in Package (SiP), or System on Chip (SoC). For example, a mobile phone device 2602, a laptop computer device 2604, a fixed location terminal device 2606, a wearable device 2608, or automotive vehicle 2610 may include a device 2600 as described herein. The device 2600 may be, for example, any of the devices and/or integrated circuit (IC) packages described herein. The devices 2602, 2604, 2606 and 2608 and the vehicle 2610 illustrated in FIG. 26 are merely exemplary. Other electronic devices may also feature the device 2600 including, but not limited to, a group of devices (e.g., electronic devices) that includes mobile devices, hand-held personal communication systems (PCS) units, portable data units such as personal digital assistants, global positioning system (GPS) enabled devices, navigation devices, set top boxes, music players, video players, entertainment units, fixed location data units such as meter reading equipment, communications devices, smartphones, tablet computers, computers, desktop computers, wearable devices (e.g., watches, glasses), Internet of things (IoT) devices, servers, routers, electronic devices implemented in automotive vehicles (e.g., autonomous vehicles), or any other device that stores or retrieves data or computer instructions, or any combination thereof.

One or more of the components, processes, features, and/or functions illustrated in FIGS. 2-20, 21A-21B, 22A-22B, 23, 24A-24D, and/or 25-26 may be rearranged and/or combined into a single component, process, feature or function or embodied in several components, processes, or functions. Additional elements, components, processes, and/or functions may also be added without departing from the disclosure. It should also be noted FIGS. 2-20, 21A-21B, 22A-22B, 23, 24A-24D, and/or 25-26 and its corresponding description in the present disclosure is not limited to dies and/or ICs. In some implementations, FIGS. 2-20, 21A-21B, 22A-22B, 23, 24A-24D, and/or 25-26 and its corresponding description may be used to manufacture, create, provide, and/or produce devices and/or integrated devices. In some implementations, a device may include a die, an integrated device, an integrated passive device (IPD), a die package, an integrated circuit (IC) device, a device package, an integrated circuit (IC) package, a wafer, a semiconductor device, a package-on-package (PoP) device, a heat dissipating device and/or an interposer.

In an aspect, a substrate includes at least one dielectric layer, a plurality of interconnects, and a curved antenna coupled to a surface of the substrate. The curved antenna is curved relative to the surface of the substrate such that at least part of the curved antenna is offset from the surface of the substrate. The curved antenna may be coupled to a surface of the at least one dielectric layer, and the curved antenna may be coupled to the plurality of interconnects. The curved antenna may comprise a concave antenna, and the concave antenna may be concave relative to the surface of the substrate. The substrate may further comprise an antenna dielectric layer located between the curved antenna and the at least one dielectric layer, where the curved antenna is coupled to a contour of the antenna dielectric layer, and where a shape of the curved antenna is defined by a shape of the contour of the antenna dielectric layer. The substrate may further comprises a first antenna dielectric layer coupled to the surface of the substrate, an antenna ground interconnect coupled to the first antenna dielectric layer, the antenna ground interconnect configured to be coupled to ground, and a second antenna dielectric layer coupled to the antenna ground interconnect, where the curved antenna is coupled to the second antenna dielectric layer. The antenna ground interconnect may comprise a curved antenna ground interconnect. The substrate may comprise an antenna ground interconnect coupled to the surface of the substrate, where the antenna ground interconnect is configured to be coupled to ground, a void located between the antenna ground interconnect and the surface of the substrate, and an antenna dielectric layer coupled to the antenna ground interconnect, where the curved antenna is coupled to the antenna dielectric layer. The antenna ground interconnect may include at least one opening. The antenna ground interconnect may comprise a curved antenna ground interconnect that is at least partially offset relative to the surface of the substrate. The substrate may further comprise a second antenna coupled to the surface of the substrate, a third antenna coupled to the surface of the substrate, and a fourth antenna coupled to the surface of the substrate, where the curved antenna, the second antenna, the third antenna and the fourth antenna are arranged in a 1×4 array. At least one of the second antenna, the third antenna and the fourth antenna includes a curved antenna. At least one of the curved antenna, the second antenna, the third antenna and the fourth antenna, is configured for receiving and/or transmitting 5G millimeter wave signals. The substrate is implemented in a radio frequency front end (RFFE) package. The curved antenna, the second antenna, the third antenna and the fourth antenna are located over a first surface of the substrate.

Another example provides an antenna device that includes at least one dielectric layer, a plurality of interconnects and a curved antenna coupled to a surface of the antenna device. The curved antenna is curved relative to the surface of the antenna device such that at least part of the curved antenna is offset from the surface of the antenna device. The curved antenna is coupled to a surface of the at least one dielectric layer. The curved antenna is coupled to the plurality of interconnects. The curved antenna comprises a concave antenna, and the concave antenna is concave relative to the surface of the antenna device. The antenna device further comprises an antenna dielectric layer located between the curved antenna and the at least one dielectric layer, where the curved antenna is coupled to a contour of the antenna dielectric layer, and where a shape of the curved antenna is defined by a shape of the contour of the antenna dielectric layer. The antenna device further comprises a first antenna dielectric layer coupled to the surface of the antenna device, an antenna ground interconnect coupled to the first antenna dielectric layer, where the antenna ground interconnect is configured to be coupled to ground, and a second antenna dielectric layer coupled to the antenna ground interconnect, wherein the curved antenna is coupled to the second antenna dielectric layer. The antenna ground interconnect comprises a curved antenna ground interconnect. The antenna device further comprises an antenna ground interconnect coupled to the surface of the antenna device, where the antenna ground interconnect is configured to be coupled to ground, a void located between the antenna ground interconnect and the surface of the antenna device, and an antenna dielectric layer coupled to the antenna ground interconnect, wherein the curved antenna is coupled to the antenna dielectric layer. The antenna ground interconnect includes at least one opening. The antenna ground interconnect comprises a curved antenna ground interconnect that is at least partially offset relative to the surface of the antenna device.

Another example provides a package that includes a substrate and a first antenna device coupled to the substrate. The first antenna device includes at least one dielectric layer, a plurality of interconnects, and a curved antenna coupled to a surface of the first antenna device. The curved antenna is curved relative to the surface of the first antenna device such that at least part of the curved antenna is offset from the surface of the first antenna device. The package further includes a second antenna device comprising a second antenna coupled to a surface of the second antenna device, a third antenna device comprising a third antenna coupled to a surface of the third antenna device, and a fourth antenna device comprising a fourth antenna coupled to a surface of the fourth antenna device, where the first antenna device, the second antenna device, the third antenna device and the fourth antenna device are arranged in a 1×4 array. The package includes a radio frequency front end (RFFE) package. At least one of the second antenna, the third antenna and the fourth antenna includes a curved antenna. A least one of the curved antenna, the second antenna, the third antenna and the fourth antenna, is configured for receiving and/or transmitting 5G millimeter wave signals.

Another example provides a method that forms at least one dielectric layer. The forms a plurality of interconnects in and over the at least one dielectric layer. The method forms a curved antenna over a surface of the at least one dielectric layer. The curved antenna is curved relative to the surface of the at least one dielectric layer. The at least part of the curved antenna is offset from the surface of the at least one dielectric layer.

It is noted that the figures in the disclosure may represent actual representations and/or conceptual representations of various parts, components, objects, devices, packages, integrated devices, integrated circuits, and/or transistors. In some instances, the figures may not be to scale. In some instances, for purpose of clarity, not all components and/or parts may be shown. In some instances, the position, the location, the sizes, and/or the shapes of various parts and/or components in the figures may be exemplary. In some implementations, various components and/or parts in the figures may be optional.

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling (e.g., mechanical coupling) between two objects. For example, if object A physically touches object B, and object B touches object C, then objects A and C may still be considered coupled to one another—even if they do not directly physically touch each other. The term "electrically coupled" may mean that two objects are directly or indirectly coupled together such that an electrical current (e.g., signal, power, ground) may travel between the two objects. Two objects that are electrically coupled may or may not have an electrical current traveling between the two objects. Electromagnetic coupling may mean that a signal from one circuit and/or component affects a signal of another circuit and/or component. Electromagnetic coupling may cause crosstalk. Electromagnetic coupling may be a form of signal coupling. The use of the terms "first", "second", "third" and "fourth" (and/or anything above fourth) is arbitrary. Any of the components described may be the first component, the second component, the third component or the fourth component. For example, a component that is referred to a second component, may be the first component, the second component, the third component or the fourth component. The terms "top" and "bottom" are arbitrary. A component that is located on top may be located over a component that is located on a bottom. A top component may be considered a bottom component, and vice versa. The term "encapsulating" means that the object may partially encapsulate or completely encapsulate another object. It is further noted that the term "over" as used in the present application in the context of one component located over another component, may be used to mean a component that is on another component and/or in another component (e.g., on a surface of a component or embedded in a component). Thus, for example, a first component that is over the second component may mean that (1) the first component is over the second component, but not directly touching the second component, (2) the first component is on (e.g., on a surface of) the second component, and/or (3) the first component is in (e.g., embedded in) the second component. The term "about 'value X'", or "approximately value X", as used in the disclosure means within 10 percent of the 'value X'. For example, a value of about 1 or approximately 1, would mean a value in a range of 0.9-1.1.

In some implementations, an interconnect is an element or component of a device or package that allows or facilitates an electrical connection between two points, elements and/or components. In some implementations, an interconnect may include a trace, a via, a pad, a pillar, a redistribution metal layer, and/or an under bump metallization (UBM) layer. In some implementations, an interconnect is an electrically conductive material that may be configured to provide an electrical path for a signal (e.g., a data signal), ground and/or power. An interconnect may be part of a circuit. An interconnect may include more than one element or component. An interconnect may be defined by one or more interconnects. Different implementations may use different processes and/or sequences for forming the interconnects. In some implementations, a chemical vapor deposition (CVD) process, a physical vapor deposition (PVD) process, a sputtering process, a spray coating, and/or a plating process may be used to form the interconnects.

Also, it is noted that various disclosures contained herein may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed.

The various features of the disclosure described herein can be implemented in different systems without departing from the disclosure. It should be noted that the foregoing aspects of the disclosure are merely examples and are not to be construed as limiting the disclosure. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

What is claimed is:

1. A substrate comprising:
   at least one dielectric layer;
   a plurality of interconnects;
   a curved antenna coupled to a surface of the substrate, the curved antenna including:
      a void area free of solid material adjacent to the surface of the substrate;
      an antenna ground interconnect over and adjacent to the void area, the antenna ground interconnect including a plurality of openings and coupled to ground; and an antenna dielectric layer over and directly coupled to the antenna ground interconnect, directly coupled to the curved antenna, and adjacent to at least a portion of the void area through the plurality of openings;
a curved antenna portion over and directly coupled to the antenna dielectric layer;
wherein the curved antenna is curved relative to the surface of the substrate, and
wherein at least part of the curved antenna is offset from the surface of the substrate.

2. The substrate of claim 1,
wherein the curved antenna is coupled to a surface of the at least one dielectric layer, and
wherein the curved antenna is coupled to the plurality of interconnects.

3. The substrate of claim 1,
wherein the curved antenna comprises a concave antenna, and
wherein the concave antenna is concave relative to the surface of the substrate.

4. The substrate of claim 1,
wherein the curved antenna portion is coupled to a contour of the antenna dielectric layer, and
wherein a shape of the curved antenna portion is defined by a shape of the contour of the antenna dielectric layer.

5. The substrate of claim 1, wherein the antenna ground interconnect comprises a curved antenna ground interconnect.

6. The substrate of claim 1,
wherein the void is adjacent to the surface of the substrate and is located between the antenna ground interconnect and the surface of the substrate.

7. The substrate of claim 1, wherein the antenna ground interconnect comprises a curved antenna ground interconnect that is at least partially offset relative to the surface of the substrate.

8. The substrate of claim 1, wherein the curved antenna comprises a dome shape.

9. The substrate of claim 1, further comprising a second antenna coupled to the surface of the substrate.

10. The substrate of claim 9, wherein the second antenna comprises a different shape than the curved antenna.

11. The substrate of claim 9, wherein the second antenna comprises a second curved antenna.

12. The substrate of claim 9, wherein the curved antenna and the second antenna comprises a mixed dome shape.

13. The substrate of claim 1, further comprising:
a second antenna coupled to the surface of the substrate;
a third antenna coupled to the surface of the substrate; and
a fourth antenna coupled to the surface of the substrate,
wherein the curved antenna, the second antenna, the third antenna and the fourth antenna are arranged in a 1×4 array.

14. The substrate of claim 13, wherein at least one of the second antenna, the third antenna and the fourth antenna includes a curved antenna.

15. The substrate of claim 13, wherein at least one of the curved antenna, the second antenna, the third antenna and the fourth antenna, is configured for receiving and/or transmitting 5G millimeter wave signals.

16. The substrate of claim 13, wherein the substrate is implemented in a radio frequency front end (RFFE) package.

17. The substrate of claim 13, wherein the curved antenna, the second antenna, the third antenna and the fourth antenna are located over a first surface of the substrate.

18. The substrate of claim 1, wherein the substrate is incorporated into a device selected from a group consisting of a music player, a video player, an entertainment unit, a navigation device, a communications device, a mobile device, a mobile phone, a smartphone, a personal digital assistant, a fixed location terminal, a tablet computer, a computer, a desktop computer, a wearable device, a laptop computer, a server, and a device in an automotive vehicle.

19. An antenna device comprising:
at least one dielectric layer;
a plurality of interconnects;
a curved antenna coupled to a surface of the antenna device, the curved antenna including:
a void area free of solid material adjacent to the surface of the antenna device;
an antenna ground interconnect over and adjacent to the void area, the antenna ground interconnect including a plurality of openings and coupled to ground; and
an antenna dielectric layer over and directly coupled to the antenna ground interconnect, directly coupled to the curved antenna, and adjacent to at least a portion of the void area through the plurality of openings;
a curved antenna portion over and directly coupled to the antenna dielectric layer;
wherein the curved antenna is curved relative to the surface of the antenna device, and
wherein at least part of the curved antenna is offset from the surface of the antenna device.

20. The antenna device of claim 19,
wherein the curved antenna is coupled to a surface of the at least one dielectric layer, and
wherein the curved antenna is coupled to the plurality of interconnects.

21. The antenna device of claim 19,
wherein the curved antenna comprises a concave antenna, and
wherein the concave antenna is concave relative to the surface of the antenna device.

22. The antenna device of claim 19,
wherein the curved antenna portion is coupled to a contour of the antenna dielectric layer, and
wherein a shape of the curved antenna portion is defined by a shape of the contour of the antenna dielectric layer.

23. The antenna device of claim 19, wherein the antenna ground interconnect comprises a curved antenna ground interconnect.

24. The antenna device of claim 19,
wherein the void is adjacent to the surface of the antenna device located between the antenna ground interconnect and the surface of the antenna device.

25. The antenna device of claim 19, wherein the antenna ground interconnect comprises a curved antenna ground interconnect that is at least partially offset relative to the surface of the antenna device.

26. The antenna device of claim 19, wherein the curved antenna comprises a dome shape.

27. A package comprising:
a substrate; and
a first antenna device coupled to the substrate, wherein the first antenna device includes:
at least one dielectric layer;
a plurality of interconnects;
a curved antenna coupled to a surface of the first antenna device, the curved antenna including:
a void area free of solid material adjacent to the surface of the first antenna device;

an antenna ground interconnect over and adjacent to the void area, the antenna ground interconnect including a plurality of openings and coupled to ground; and an antenna dielectric layer over and directly coupled to the antenna ground interconnect, directly coupled to the curved antenna, and adjacent to at least a portion of the void area through the plurality of openings;

a curved antenna portion over and directly coupled to the antenna dielectric layer;

wherein the curved antenna is curved relative to the surface of the first antenna device, and wherein at least part of the curved antenna is offset from the surface of the first antenna device.

28. The package of claim 27, further comprising:
a second antenna device comprising a second antenna coupled to a surface of the second antenna device;
a third antenna device comprising a third antenna coupled to a surface of the third antenna device; and
a fourth antenna device comprising a fourth antenna coupled to a surface of the fourth antenna device,
wherein the first antenna device, the second antenna device, the third antenna device and the fourth antenna device are arranged in a 1×4 array.

29. The package of claim 27, wherein the package includes a radio frequency front end (RFFE) package.

30. The package of claim 28, wherein at least one of the second antenna, the third antenna and the fourth antenna includes a curved antenna.

31. The package of claim 28, wherein at least one of the curved antenna, the second antenna, the third antenna and the fourth antenna, is configured for receiving and/or transmitting 5G millimeter wave signals.

32. A method comprising:
forming at least one dielectric layer;
forming a plurality of interconnects in and over the at least one dielectric layer;
forming a curved antenna over a surface of the at least one dielectric layer, wherein forming the curved antenna includes:
forming a void area free of solid material and adjacent to the at least one dielectric layer;
forming an antenna ground interconnect over the void area and adjacent to the void area, the antenna ground interconnect including a plurality of openings and coupled to ground; and
forming an antenna dielectric layer over the antenna ground interconnect and directly coupling the antenna dielectric layer to the antenna ground interconnect and to the curved antenna, and forming the antenna dielectric layer adjacent to at least a portion of the void area through the plurality of openings;
forming a curved antenna portion over and directly coupled to the antenna dielectric layer;
wherein the curved antenna is curved relative to the surface of the at least one dielectric layer, and
wherein at least part of the curved antenna is offset from the surface of the at least one dielectric layer.

33. The method of claim 32,
wherein the curved antenna portion is formed over the antenna dielectric layer,
wherein the curved antenna portion is coupled to a contour of the antenna dielectric layer, and
wherein a shape of the curved antenna is defined by a shape of the contour of the second antenna dielectric layer.

34. The method of claim 32, wherein the antenna ground interconnect comprises a curved antenna ground interconnect.

35. The method of claim 32, further comprising:
forming the first antenna dielectric layer over the surface of the at least one dielectric layer,
wherein the void between the antenna ground interconnect and the surface of the at least one dielectric layer is created by removing at least part of the antenna dielectric layer.

36. The method of claim 32, wherein the at least one dielectric layer, the plurality of interconnects and the curved antenna is part of a substrate.

37. The method of claim 32, wherein the at least one dielectric layer, the plurality of interconnects and the curved antenna is part of an antenna device.

* * * * *